(12) United States Patent
Asano et al.

(10) Patent No.: US 10,625,379 B2
(45) Date of Patent: Apr. 21, 2020

(54) ALUMINUM ALLOY CLADDING MATERIAL, MANUFACTURING METHOD THEREFOR, AND HEAT EXCHANGER USING SAID ALUMINUM ALLOY CLADDING MATERIAL

(71) Applicant: UACJ CORPORATION, Tokyo (JP)

(72) Inventors: Taichi Asano, Kariya (JP); Masaki Harada, Kariya (JP); Shoei Teshima, Kariya (JP); Makoto Ando, Tokyo (JP); Wataru Narita, Tokyo (JP); Naoki Yamashita, Tokyo (JP)

(73) Assignee: UACJ Corporation, Tokyo (JP)

( * ) Notice: Subject to any disclaimer, the term of this patent is extended or adjusted under 35 U.S.C. 154(b) by 188 days.

(21) Appl. No.: 15/742,418

(22) PCT Filed: Jul. 8, 2016

(86) PCT No.: PCT/JP2016/070277
§ 371 (c)(1),
(2) Date: Jan. 5, 2018

(87) PCT Pub. No.: WO2017/007019
PCT Pub. Date: Jan. 12, 2017

(65) Prior Publication Data
US 2018/0193961 A1    Jul. 12, 2018

(30) Foreign Application Priority Data

Jul. 8, 2015 (JP) .................. 2015-137331
Jul. 4, 2016 (JP) .................. 2016-132727

(51) Int. Cl.
*B23K 35/28*    (2006.01)
*F28F 21/08*    (2006.01)
(Continued)

(52) U.S. Cl.
CPC ........ *B23K 35/288* (2013.01); *B23K 35/0238* (2013.01); *B23K 35/286* (2013.01);
(Continued)

(58) Field of Classification Search
None
See application file for complete search history.

(56) References Cited

U.S. PATENT DOCUMENTS

2011/0287277 A1    11/2011    Kimura et al.
2015/0004428 A1    1/2015     Kaimya et al.
2016/0138879 A1    5/2016     Matsukado et al.

FOREIGN PATENT DOCUMENTS

CN    103112211 A    5/2013
CN    104018163 A    9/2014
(Continued)

OTHER PUBLICATIONS

EESR issued in EP Patent App. No. EP 16 82 1487, dated Oct. 24, 2018.
(Continued)

*Primary Examiner* — Daniel J. Schleis
(74) *Attorney, Agent, or Firm* — Greer Burns & Crain Ltd.

(57) ABSTRACT

Provided is an aluminum alloy clad material including an aluminum alloy core material and a first brazing filler metal that is clad on one surface or both surfaces of the core material, wherein the core material and the first brazing filler metal each include an aluminum alloy having a predetermined composition, the existence density of Al—Mn based intermetallic compounds having a circle-equivalent diameter of at least 0.1 μm in the first brazing filler metal before brazing heating is at least $1.0 \times 10^5$ pieces/mm$^2$, and the existence density of Al—Mn based intermetallic compounds having a circle-equivalent diameter of at least 2 μm in the
(Continued)

first brazing filler metal after brazing heating is at least 300 pieces/mm². Further provided are a method for producing the aluminum alloy clad material and a heat exchanger employing the aluminum alloy clad material.

21 Claims, 1 Drawing Sheet

(51) Int. Cl.
    *B32B 15/01*     (2006.01)
    *C22C 21/00*     (2006.01)
    *F28D 1/03*     (2006.01)
    *B23K 35/02*     (2006.01)
    *C22F 1/04*     (2006.01)
    *C22C 21/14*     (2006.01)
    *B32B 15/20*     (2006.01)
    *C22C 21/02*     (2006.01)
    *C22C 21/08*     (2006.01)
    *C22C 21/10*     (2006.01)
    *C22F 1/047*     (2006.01)
    *C22F 1/053*     (2006.01)
    *F28D 9/00*     (2006.01)

(52) U.S. Cl.
    CPC ............ *B32B 15/016* (2013.01); *B32B 15/20* (2013.01); *C22C 21/00* (2013.01); *C22C 21/02* (2013.01); *C22C 21/08* (2013.01); *C22C 21/10* (2013.01); *C22C 21/14* (2013.01); *C22F 1/04* (2013.01); *C22F 1/047* (2013.01); *C22F 1/053* (2013.01); *F28D 1/0325* (2013.01); *F28F 21/084* (2013.01); *F28F 21/089* (2013.01); *F28D 9/0025* (2013.01); *F28F 2245/00* (2013.01); *F28F 2275/04* (2013.01); *Y10T 428/12764* (2015.01)

(56) References Cited

FOREIGN PATENT DOCUMENTS

| | | |
|---|---|---|
| CN | 104105804 A | 10/2014 |
| JP | 2008-188616 A | 8/2008 |
| JP | 2008188616 A | 8/2008 |
| JP | 2010-255013 A | 11/2010 |
| JP | 2013-133517 A | 7/2013 |
| JP | 2014-55326 A | 3/2014 |
| WO | 2010137649 A1 | 12/2010 |
| WO | WO 2010/137649 A1 | 12/2010 |
| WO | WO 2011/034102 A1 | 3/2011 |
| WO | WO 2016/080433 A1 | 5/2016 |

OTHER PUBLICATIONS

Int'l. Search Report issued in Int'l. App. No. PCT/JP2016/070277, dated Oct. 11, 2016.
Office Action dated Mar. 4, 2019, issued for the corresponding CN patent application No. 201680035541.5 and the English translation.

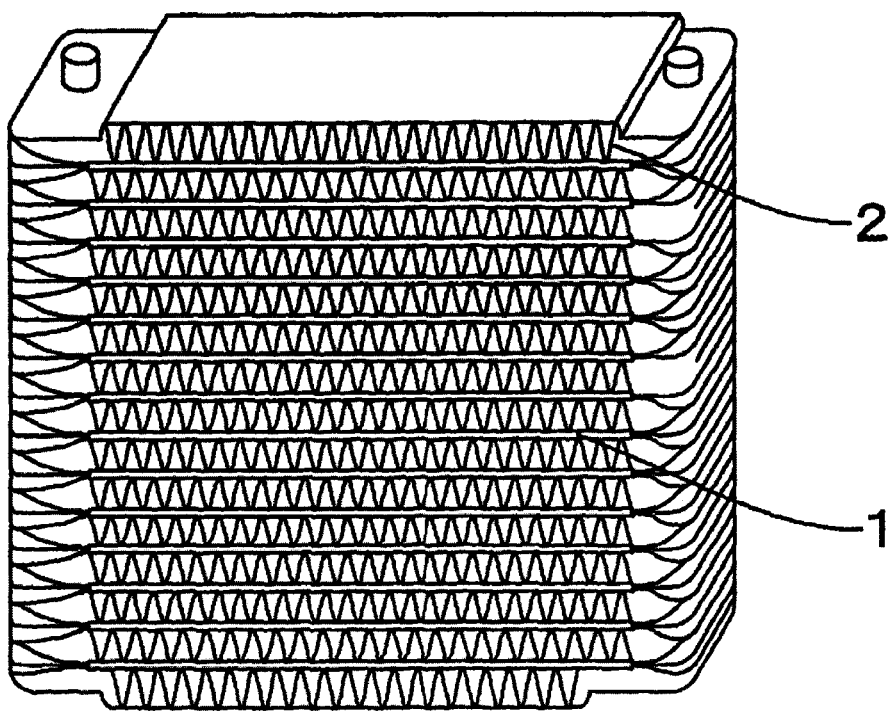

ALUMINUM ALLOY CLADDING MATERIAL, MANUFACTURING METHOD THEREFOR, AND HEAT EXCHANGER USING SAID ALUMINUM ALLOY CLADDING MATERIAL

This is a National Phase Application filed under 35 U.S.C. § 371, of International Application No. PCT/JP2016/070277, filed Jul. 8, 2016, the contents of which are incorporated by reference.

TECHNICAL FIELD

The present disclosure relates to an aluminum alloy clad material and a method for producing the same, the aluminum alloy clad material having high corrosion resistance and being suitably used as a passage forming member for a coolant or high-temperature compressed air in a heat exchanger, such as a radiator. The present disclosure further relates to a heat exchanger for automotive and other applications, equipped with a passage forming component employing such highly corrosion-resistant alloy clad material.

BACKGROUND ART

An aluminum alloy is lightweight and has high thermal conductivity, and also achieves high corrosion resistance when properly treated. Thus, aluminum alloys are used for heat exchangers for automotive and other applications, such as radiators, condensers, evaporators, heaters, intercoolers, and oil coolers. Conventional tube materials for automotive heat exchangers include, for example, a two-layer clad material and a three-layer clad material, where the two-layer clad material has a core material made of an Al—Mn based alloy, such as 3003 alloy, and a brazing filler metal made of an Al—Si based alloy or a sacrificial anode material made of an Al—Zn based alloy that is clad on one surface of the core material, while the three-layer clad material additionally has a brazing filler metal made of an Al—Si alloy that is clad on the other surface of the core material. For a heat exchanger, in general, such clad material and a corrugated fin material are combined and brazed at a temperature as high as about 600° C. to be joined together.

Oil coolers, for example, usually employ a water cooling system in which heat is exchanged between engine oil and cooling water to cool the engine oil. Nowadays some intercoolers also employ such water cooling system. As the cooling water, an LLC containing an anti-corrosive agent as an additive should be used, but tap water or well water may sometimes be used in developing countries, for example. The tap water or well water can contain chloride ions, and thus may destroy a film of aluminum oxide to cause pitting corrosion, resulting in corrosion perforation in the passage for cooling water.

A typical countermeasure against this problem is cladding a sacrificial anode material made of an Al—Zn based alloy to give the sacrificial protection effect, by which the corrosion develops laterally to prevent the corrosion perforation caused by pitting corrosion. However, since tap water or well water generally contains chloride ions at a concentration as low as about 1,200 ppm or less, pitting corrosion is more likely to occur when the cooling water is at a low temperature around room temperature. At a high temperature, pitting corrosion is less likely to occur because a thick film of aluminum oxide is formed; however, a corrosion product, such as aluminum hydroxide, is created between the inside and outside of the pitting corrosion that occurs at room temperature, the corrosion product occludes the inside of the pitting corrosion, and thus local alkalization is expedited inside the pitting corrosion. When the inside of the occluded pitting corrosion becomes strongly alkaline, the corrosion turns into uniform corrosion with a higher corrosion speed, which means the sacrificial anode effect is not fully exerted, resulting in creation of corrosion perforation extending not laterally but deeply.

One method for forming a passage for cooling water in a heat exchanger includes stacking plates 1, which are made by forming a clad material into a passage for cooling water, via corrugated fins 2 as illustrated in FIG. 1. This method is advantageous because a heat exchanger can be changed in size merely by changing the number of stacks, thus providing higher design flexibility. However, to join plates together, the plate material itself is needed to supply a brazing filler metal during brazing.

In light of the foregoing, in order to apply the stacked-plate type to a water-cooling heat exchanger, it is necessary to clad layers that have a plurality of functions including: supplying a brazing filler metal during brazing to the inner side of the passage made of a material used for the passage forming component; having a sacrificial protection feature against pitting corrosion; and preventing the corrosion that may be caused by local strong alkalization.

Techniques for supplying a brazing filler metal during brazing and giving a sacrificial protection feature against pitting corrosion are described in Patent Literatures 1 and 2. These patent literatures describe methods suggested for achieving an excellent sacrificial protection feature by containing Zn and low-concentration Si in a clad layer to form a liquid-phase brazing filler metal during brazing to allow for the joining, while leaving part of the clad layer in the solid phase. In the techniques described therein, the molten clad layer creates through brazing a solidified structure in two phases: primary and eutectic. These patent literatures address the problem of preferential corrosion of the eutectic part due to a less noble potential of the eutectic phase than the primary phase, causing early separation of the primary part supposed to act as a sacrificial anode material, resulting in impaired corrosion resistance. Solutions to this problem are also disclosed in the literatures. However, these patent literatures neither recognize the problem of corrosion caused by local strong alkalization nor describe any method for preventing such corrosion.

CITATION LIST

Patent Literature

Patent Literature 1 Unexamined Japanese Patent Application Kokai Publication No. 2010-255013
Patent Literature 2 International Publication No. WO 2011-034102

SUMMARY OF INVENTION

Technical Problem

As described above, when an aluminum alloy clad material is used as, for example, a passage forming component material for a heat exchanger, conventional techniques have difficulty in providing the aluminum alloy clad material that prevents corrosion caused by local alkalization in addition to supplying a brazing filler metal during brazing heating and providing a sacrificial protection feature after the brazing heating.

The present disclosure has been accomplished with the intent to solve the above-described problems, and objectives of the disclosure include providing an aluminum alloy clad material that supplies a brazing filler metal during brazing heating, provides a sacrificial protection feature after the brazing heating, and prevents corrosion caused by local alkalization, and providing a passage forming component for a heat exchanger for automotive and other applications by employing such aluminum alloy clad material.

Solution to Problem

The present inventors have conducted intensive studies on the foregoing problems. As a result, the inventors have found that the foregoing problems can be solved by preparing a core material, (first and second) brazing filler metals, and a sacrificial anode material each having a specific alloy composition and metal structure, and by producing a clad material in which one or both of the surfaces of the core material is clad with the first brazing filler metal, or a clad material in which one surface of the core material is clad with the first brazing filler metal and the other surface is clad with either the sacrificial anode material or the second brazing filler metal, and have eventually accomplished the present disclosure.

In claim 1 of the present disclosure, an aluminum alloy clad material includes: a core material including an aluminum alloy; and a first brazing filler metal that is clad on one surface or both surfaces of the core material, wherein the core material includes an aluminum alloy containing Si: 0.05 to 1.50 mass %, Fe: 0.05 to 2.00 mass %, and Mn: 0.5 to 2.0 mass %, with a balance consisting of Al and inevitable impurities, wherein the first brazing filler metal includes an aluminum alloy containing Si: 2.5 to 7.0 mass %, Fe: 0.05 to 1.20 mass %, Zn: 0.5 to 8.0 mass %, and Mn: 0.3 to 2.0 mass %, with the balance consisting of Al and inevitable impurities, wherein an existence density of Al—Mn based intermetallic compounds having a circle-equivalent diameter of at least 0.1 µm in the first brazing filler metal before brazing heating is at least $1.0 \times 10^5$ pieces/mm$^2$, and wherein an existence density of Al—Mn based intermetallic compounds having a circle-equivalent diameter of at least 2 µm in the first brazing filler metal after brazing heating is at least 300 pieces/mm$^2$.

In claim 2 of the present disclosure, the first brazing filler metal according to claim 1 includes the aluminum alloy further containing at least one selected from Cu: 0.05 to 0.60 mass %, Ti: 0.05 to 0.30 mass %, Zr: 0.05 to 0.30 mass %, Cr: 0.05 to 0.30 mass %, and V: 0.05 to 0.30 mass %.

In claim 3 of the present disclosure, the first brazing filler metal according to claim 1 or 2 includes the aluminum alloy further containing at least one selected from Na: 0.001 to 0.050 mass % and Sr: 0.001 to 0.050 mass %.

In claim 4 of the present disclosure, the core material according to any one of claims 1 to 3 includes the aluminum alloy further containing at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

In claim 5 of the present disclosure, a method for producing the aluminum alloy clad material according to any one of claims 1 to 4 includes: a step of casting the aluminum alloys for the core material and the first brazing filler metal, respectively; a hot rolling step of hot rolling an ingot of the cast first brazing filler metal to a predetermined thickness; a cladding step of obtaining a clad material by cladding the first brazing filler metal that has been hot rolled to a predetermined thickness on one surface or both surfaces of an ingot of the core material; a hot clad rolling step of hot rolling the clad material; a cold rolling step of cold rolling the clad material that has been hot clad rolled; and at least one annealing step of annealing the clad material carried out during or after the cold rolling step or during and after the cold rolling step, wherein the step of hot rolling the first brazing filler metal includes a heating stage, a holding stage, and a hot rolling stage, wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower, wherein, in the holding stage, the holding temperature is between 450 and 560° C. inclusive and a holding time is at least one hour, and wherein a time period during which the first brazing filler metal is at a temperature of at least 400° C. in the hot rolling stage is at least 5 minutes.

In claim 6 of the present disclosure, an aluminum alloy clad material includes: a core material including an aluminum alloy; a first brazing metal that is clad on one surface of the core material; and a second brazing filler metal that is clad on another surface of the core material, wherein the core material includes an aluminum alloy containing Si: 0.05 to 1.50 mass %, Fe: 0.05 to 2.00 mass %, and Mn: 0.5 to 2.0 mass %, with a balance consisting of Al and inevitable impurities, wherein the first brazing filler metal includes an aluminum alloy containing Si: 2.5 to 7.0 mass %, Fe: 0.05 to 1.20 mass %, Zn: 0.5 to 8.0 mass %, and Mn: 0.3 to 2.0 mass %, with the balance consisting of Al and inevitable impurities, wherein the second brazing filler metal includes an aluminum alloy containing Si: 2.5 to 13.0 mass % and Fe: 0.05 to 1.20 mass %, with the balance consisting of Al and inevitable impurities, wherein an existence density of Al—Mn based intermetallic compounds having a circle-equivalent diameter of at least 0.1 µm in the first brazing filler metal before brazing heating is at least $1.0 \times 10^5$ pieces/mm$^2$, and wherein an existence density of Al—Mn based intermetallic compounds having a circle-equivalent diameter of at least 2 µm in the first brazing filler metal after brazing heating is at least 300 pieces/mm$^2$.

In claim 7 of the present disclosure, the first brazing filler metal according to claim 6 includes the aluminum alloy further containing at least one selected from Cu: 0.05 to 0.60 mass %, Ti: 0.05 to 0.30 mass %, Zr: 0.05 to 0.30 mass %, Cr: 0.05 to 0.30 mass %, and V: 0.05 to 0.30 mass %.

In claim 8 of the present disclosure, the first brazing filler metal according to claim 6 or 7 includes the aluminum alloy further containing at least one selected from Na: 0.001 to 0.050 mass % and Sr: 0.001 to 0.050 mass %.

In claim 9 of the present disclosure, the core material according to any one of claims 6 to 8 includes the aluminum alloy further containing at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

In claim 10 of the present disclosure, the second brazing filler metal according to any one of claims 6 to 9 includes the aluminum alloy further containing at least one selected from Mn: 0.05 to 2.00 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

In claim 11 of the present disclosure, the second brazing filler metal according to claims 6 to 10 includes the aluminum alloy further containing at least one selected from Na: 0.001 to 0.050 mass % and Sr: 0.001 to 0.050 mass %.

In claim 12 of the present disclosure, a method for producing the aluminum alloy clad material according to any one of claims 6 to 11 includes: a step of casting the aluminum alloys for the core material, the first brazing filler metal, and the second brazing filler metal, respectively; a hot rolling step of hot rolling each of ingots of the cast first brazing filler metal and the cast second brazing filler metal to a predetermined thickness; a cladding step of obtaining a clad material by cladding the first brazing filler metal that has been hot rolled to a predetermined thickness on one surface of an ingot of the core material, and by cladding the second brazing filler metal that has been hot rolled to a predetermined thickness on the other surface of the ingot of the core material; a hot clad rolling step of hot rolling the clad material; a cold rolling step of cold rolling the clad material that has been hot clad rolled; and at least one annealing step of annealing the clad material carried out during or after the cold rolling step or during and after the cold rolling step, wherein the step of hot rolling the first brazing filler metal includes a heating stage, a holding stage, and a hot rolling stage, wherein a rate of temperature rise until a temperature reaches 400° C. in the heating stage is 30° C./h or higher, and a rate of TO temperature rise from when the temperature reaches 400° C. until the temperature reaches a holding temperature in the holding stage is 60° C./h or lower, wherein, in the holding stage, the holding temperature is between 450 and 560° C. inclusive and a holding time is at least one hour, and wherein a time period during which the first brazing filler metal is at a temperature of at least 400° C. in the hot rolling stage is at least 5 minutes.

In claim 13 of the present disclosure, an aluminum alloy clad material includes: a core material including an aluminum alloy; a first brazing metal that is clad on one surface of the core material; and a sacrificial anode material metal that is clad on another surface of the core material, wherein the core material includes an aluminum alloy containing Si: 0.05 to 1.50 mass %, Fe: 0.05 to 2.00 mass %, and Mn: 0.5 to 2.0 mass %, with a balance consisting of Al and inevitable impurities, wherein the first brazing filler metal includes an aluminum alloy containing Si: 2.5 to 7.0 mass %, Fe: 0.05 to 1.20 mass %, Zn: 0.5 to 8.0 mass %, and Mn: 0.3 to 2.0 mass %, with the balance consisting of Al and inevitable impurities, wherein the sacrificial anode material includes an aluminum alloy containing Zn: 0.5 to 8.0 mass %, Si: 0.05 to 1.50 mass % and Fe: 0.05 to 2.00 mass %, with the balance consisting of Al and inevitable impurities, wherein an existence density of Al—Mn based intermetallic compounds having a circle-equivalent diameter of at least 0.1 μm in the first brazing filler metal before brazing heating is at least $1.0 \times 10^5$ pieces/mm$^2$, and wherein an existence density of Al—Mn based intermetallic compounds having a circle-equivalent diameter of at least 2 μm in the first brazing filler metal after brazing heating is at least 300 pieces/mm$^2$.

In claim 14 of the present disclosure, the first brazing filler metal according to claim 13 includes the aluminum alloy further containing at least one selected from Cu: 0.05 to 0.60 mass %, Ti: 0.05 to 0.30 mass %, Zr: 0.05 to 0.30 mass %, Cr: 0.05 to 0.30 mass %, and V: 0.05 to 0.30 mass %.

In claim 15 of the present disclosure, the first brazing filler metal according to claim 13 or 14 includes the aluminum alloy further containing at least one selected from Na: 0.001 to 0.050 mass % and Sr: 0.001 to 0.050 mass %.

In claim 16 of the present disclosure, the core material according to any one of claims 13 to 15 includes the aluminum alloy further containing at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

In claim 17 of the present disclosure, the sacrificial anode material according to any one of claims 13 to 16 includes the aluminum alloy further containing at least one selected from Ni: 0.05 to 2.00 mass %, Mn: 0.05 to 2.00 mass %, Mg: 0.05 to 3.00 mass %, Ti: 0.05 to 0.30 mass %, Zr: 0.05 to 0.30 mass %, Cr: 0.05 to 0.30 mass %, and V: 0.05 to 0.30 mass %.

In claim 18 of the present disclosure, a method for producing the aluminum alloy clad material includes: a step of casting the aluminum alloys for the core material, the first brazing filler metal, and the sacrificial anode material, respectively; a hot rolling step of hot rolling each of ingots of the cast first brazing filler metal and the cast sacrificial anode material to a predetermined thickness; a cladding step of obtaining a clad material by cladding the first brazing filler metal that has been hot rolled to a predetermined thickness on one surface of the ingot of the core material, and by cladding the sacrificial anode material that has been hot rolled to a predetermined thickness on the other surface of the ingot of the core material; a hot clad rolling step of hot rolling the clad material; a cold rolling step of cold rolling the clad material that has been hot clad rolled; and at least one annealing step of annealing the clad material carried out during or after the cold rolling step or during and after the cold rolling step, wherein the step of hot rolling the first brazing filler metal includes a heating stage, a holding stage, and a hot rolling stage, wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower, wherein, in the holding stage, the holding temperature is between 450 and 560° C. inclusive and a holding time is at least one hour, and wherein a time period during which the first brazing filler metal is at a temperature of at least 400° C. in the hot rolling stage is at least 5 minutes.

In claim 19 of the present disclosure, a heat exchanger includes the aluminum alloy clad material according to any one of claims 1 to 4, the aluminum alloy clad material being used as at least a passage forming component, wherein at least either one of surfaces of the first brazing filler metal is exposed to a solution with chloride ions at a concentration of 1,200 ppm or less.

In claim 20 of the present disclosure, a heat exchanger includes the aluminum alloy clad material according to any one of claims 6 to 11 and 13 to 17, the aluminum alloy clad material being used as at least a passage forming component, wherein a surface of the first brazing filler metal is exposed to a solution with chloride ions at a concentration of 1,200 ppm or less.

Advantageous Effects of Invention

According to the present disclosure, there are provided an aluminum alloy clad material and a passage forming component formed by using such material for heat exchangers for automotive and other applications, the aluminum alloy clad material supplying a brazing filler metal during brazing heating, having a sacrificial protection feature after the brazing heating, and preventing corrosion caused by local alkalization. This clad material is suitably used as a passage forming component material for heat exchangers for automotive and other applications because the clad material is lightweight, has good heat conductivity, and has excellent brazability such as erosion resistance.

BRIEF DESCRIPTION OF DRAWINGS

FIG. 1 is a perspective view of a heat changer in which plates are stacked via corrugated fins, the plates being formed of a clad material and serving as a passage for cooling water.

DESCRIPTION OF EMBODIMENTS

Preferred embodiments of a highly corrosion-resistant aluminum alloy clad material and of a method for producing the aluminum alloy clad material will now be described in detail.

1. Layers Forming Aluminum Alloy Clad Material

The aluminum alloy clad material of the present disclosure has excellent corrosion resistance and brazability, owing to appropriate control of the alloy composition and metal structure of a first brazing filler metal that has both brazability and sacrificial protection properties. The first brazing filler metal may be clad on one surface of a core material to form a two-layer clad material, or may be clad on both surfaces of the core material to form a three-layer clad material.

Alternatively, the two-layer clad material may have a second brazing filler metal, which is a conventional Al—Si based alloy brazing filler metal, to form a three-layer clad material, or may have an Al—Zn based alloy sacrificial anode material to form a three-layer clad material, the second brazing filler metal or the sacrificial anode material being clad on the core material's other surface where the first brazing filler metal is not clad.

The following describes components of the first brazing filler metal, the core material, the second filler metal, and the sacrificial anode material.

2. First Brazing Filler Metal

An aluminum alloy used for the first brazing filler metal contains Si: 2.5 to 7.0 mass % ("mass %" is hereinafter simply denoted as "%"), Fe: 0.05 to 1.20%, Zn: 0.5 to 8.0%, and Mn: 0.3 to 2.0% as essential elements, with the balance consisting of Al and inevitable impurities.

The first brazing filler metal may further contain, as first selective added element(s), at least one selected from Cu: 0.05 to 0.60%, Ti: 0.05 to 0.30%, Zr: 0.05 to 0.30%, Cr: 0.05 to 0.30%, and V: 0.05 to 0.30%. The first brazing filler metal may further contain, as second selective added element(s), at least one selected from Na: 0.001 to 0.050% and Sr: 0.001 to 0.050%. In addition to the above-mentioned essential elements and first and second selective added elements, the brazing filler metal may contain inevitable impurities of 0.05% or less for each impurity and 0.15% in total. The following describes the individual components.

Si:

Addition of Si lowers the melting point of the brazing filler metal to generate a liquid phase, allowing the brazing to be carried out. General alloys used as brazing filler metals, such as 4045 alloy, can contain up to about 11% Si. In contrast, reducing the Si content allows the brazing filler metal to remain in the solid phase to some extent during brazing, thereby giving an excellent sacrificial protection feature. The Si content is 2.5 to 7.0%. When the Si content is less than 2.5%, the liquid phase is generated only to a small extent and the brazing function is difficult to obtain. When the Si content exceeds 7.0%, an excessive amount of Si is diffused to a counterpart member, such as a fin, causing the counterpart member to melt. The Si content is preferably 3.5 to 6.0%.

Fe:

Since Fe tends to form an Al—Fe based, Al—Fe—Si based, Al—Fe—Mn based, or Al—Fe—Mn—Si based intermetallic compound, Fe may reduce the amount of Si effective in brazing to deteriorate brazability. The Fe content is 0.05 to 1.20%. When the Fe content is less than 0.05%, an ingot of high-purity aluminum needs to be used, leading to higher cost. When the Fe content exceeds 1.20%, the amount of Si effective in brazing is reduced, resulting in insufficient brazing. The Fe content is preferably 0.1 to 0.5%.

Zn:

Zn can make the pitting potential less noble, and can improve corrosion resistance with the sacrificial protection effect by producing a potential difference relative to the core material. The Zn content is 0.5 to 8.0%. When the Zn content is less than 0.5%, the effect of improving corrosion resistance with the sacrificial protection effect is not obtained to a sufficient extent. When the Zn content exceeds 8.0%, corrosion is accelerated to destroy the sacrificial protection layer earlier, resulting in lower corrosion resistance. The Zn content is preferably 1.0 to 6.0%.

Mn:

Mn tends to form an Al—Mn based, Al—Fe—Mn based, or Al—Fe—Mn—Si based intermetallic compound (hereinafter simply referred to as "Al—Mn based intermetallic compound") to make the corrosion potential more noble by activating the cathodic reaction when corrosion is in progress, so that pitting corrosion is more likely to occur. As described above, when the form of corrosion is pitting corrosion, the corrosion attributable to local alkalization does not occur. In other words, Mn has the effect of preventing local alkalization to improve corrosion resistance. The Mn content is 0.3 to 2.0%. When the Mn content is less than 0.3%, the effect is not obtained to a sufficient extent. When the Mn content exceeds 2.0%, giant intermetallic compounds are more likely to be formed during casting, resulting in deteriorated plasticity. The Mn content is preferably 0.4 to 1.8%.

Cu:

Cu may be contained because Cu improves the strength through solid solution strengthening. The Cu content is 0.05 to 0.60%. When the Cu content is less than 0.05%, the effect is not sufficient. When the Cu content exceeds 0.60%, the pitting potential is made more noble to lose the sacrificial protection effect provided by Zn. The Cu content is preferably 0.10 to 0.50%.

Ti:

Ti may be contained because Ti improves the strength through solid solution strengthening and also improves corrosion resistance. The Ti content is 0.05 to 0.30%. When the Ti content is less than 0.05%, the effect is not obtained. When the Ti content exceeds 0.30%, giant intermetallic compounds are more likely to be formed, resulting in deteriorated plasticity. The Ti content is preferably 0.10 to 0.20%.

Zr:

Zr may be contained because Zr improves the strength through solid solution strengthening, while causing Al—Zr based intermetallic compounds to be precipitated so that coarse crystal grains are formed after brazing heating. The Zr content is 0.05 to 0.30%. When the Zr content is less than 0.05%, the effect is not obtained. When the Zr content exceeds 0.30%, giant intermetallic compounds are more likely to be formed, resulting in deteriorated plasticity. The Zr content is preferably 0.10 to 0.20%.

Cr:

Cr may be contained because Cr improves the strength through solid solution strengthening, while causing Al—Cr based intermetallic compounds to be precipitated so that coarse crystal grains are formed after brazing heating. The Cr content is 0.05 to 0.30%. When the Cr content is less than 0.05%, the effect is not obtained. When the Cr content exceeds 0.30%, giant intermetallic compounds are more likely to be formed, resulting in deteriorated plasticity. The Cr content is preferably 0.10 to 0.20%.

V:

V may be contained because V improves the strength through solid solution strengthening and improves corrosion resistance. The V content is 0.05 to 0.30%. When the V content is less than 0.05%, the effect is not obtained. When the V content exceeds 0.30%, giant intermetallic compounds are more likely to be formed, resulting in deteriorated plasticity. The V content is preferably 0.10 to 0.20%.

Na and Sr:

Na and Sr each exert the effect of making Si particles in the first brazing filler metal finer. Each of the Na content and the Sr content is 0.001 to 0.050%. When the Na content or Sr content is less than 0.001%, the effect is not obtained to a sufficient extent. When the Na content or Sr content exceeds 0.050%, a thicker oxide film is created, resulting in deteriorated brazability. The Na content and Sr content each are preferably 0.003 to 0.020%.

At least one of these elements: Cu, Ti, Zr, Cr, V, Na, and Sr may be added to the first brazing filler metal as may be necessary.

3. Core Material

An aluminum alloy used for the core material contains Si: 0.05 to 1.50%, Fe: 0.05 to 2.00%, and Mn: 0.5 to 2.0% as essential elements, with the balance consisting of Al and inevitable impurities.

The core material may further contain, as selective added element(s), at least one selected from Mg: 0.05 to 0.50%, Cu: 0.05 to 1.50%, Ti: 0.05 to 0.30%, Zr: 0.05 to 0.30%, Cr: 0.05 to 0.30%, and V: 0.05 to 0.30%.

In addition to the above-mentioned essential elements and selective added elements, the core material may contain inevitable impurities of 0.05% or less for each impurity and 0.15% in total.

As an aluminum alloy used for the core material of the present disclosure, Al—Mn based alloys represented by JIS 3000 series alloys, such as JIS 3003 alloy, are suitably used. The following describes the individual components in detail.

Si:

Si forms an Al—Fe—Mn—Si based intermetallic compound with Fe and Mn to improve the strength through dispersion strengthening, or to form a solid solution in the aluminum matrix to improve the strength through solid solution strengthening. The Si content is 0.05 to 1.50%. When the Si content is less than 0.05%, an ingot of high-purity aluminum needs to be used, leading to higher cost. When the Si content exceeds 1.50%, the core material has a lower melting point and is more likely to melt. The Si content is preferably 0.10 to 1.20%.

Fe:

Fe forms an Al—Fe—Mn—Si based intermetallic compound with Si and Mn to improve the strength through dispersion strengthening. The Fe content is 0.05 to 2.00%. When the Fe content is less than 0.05%, an ingot of high-purity aluminum needs to be used, leading to higher cost. When the Fe content exceeds 2.00%, giant intermetallic compounds are more likely to be formed during casting, resulting in deteriorated plasticity. The Fe content is preferably 0.10 to 1.50%.

Mn:

Mn forms an Al—Mn—Si based intermetallic compound with Si and also forms an Al—Mn—Fe—Si based intermetallic compound with Si and Fe, to improve the strength through dispersion strengthening, or to form a solid solution in the aluminum matrix to improve the strength through solid solution strengthening. The Mn content is 0.5 to 2.0%. When the Mn content is less than 0.5%, the effect is insufficient. When the Mn content exceeds 2.0%, giant intermetallic compounds are more likely to be formed during casting, resulting in deteriorated plasticity. The Mn content is preferably 0.8 to 1.8%.

Mg:

Mg may be contained because Mg improves the strength through precipitation of $Mg_2Si$. The Mg content is 0.05 to 0.50%. When the Mg content is less than 0.05%, the effect is not exerted sufficiently. When the Mg content exceeds 0.50%, brazing is difficult to carry out. The Mg content is preferably 0.10 to 0.40%.

Cu:

Cu may be contained because Cu improves the strength through solid solution strengthening. The Cu content is 0.05 to 1.50%. When the Cu content is less than 0.05%, the effect is not exerted sufficiently. When the Cu content exceeds 1.50%, the aluminum alloy is more likely to crack during casting. The Cu content is preferably 0.30 to 1.00%.

Ti:

Ti may be contained because Ti improves the strength through solid solution strengthening. The Ti content is 0.05 to 0.30%. When the Ti content is less than 0.05%, the effect is not exerted sufficiently. When the Ti content exceeds 0.30%, giant intermetallic compounds are more likely to be formed, resulting in deteriorated plasticity. The Ti content is preferably 0.10 to 0.20%.

Zr:

Zr may be contained because Zr improves the strength through solid solution strengthening, while causing Al—Zr based intermetallic compounds to be precipitated so that coarse crystal grains are formed after brazing heating. The Zr content is 0.05 to 0.30%. When the Zr content is less than 0.05%, the effect is not obtained. When the Zr content exceeds 0.30%, giant intermetallic compounds are more likely to be formed, resulting in deteriorated plasticity. The Zr content is preferably 0.10 to 0.20%.

Cr:

Cr may be contained because Cr improves the strength through solid solution strengthening, while causing Al—Cr based intermetallic compounds to be precipitated so that coarse crystal grains are formed after brazing heating. The Cr content is 0.05 to 0.30%. When the Cr content is less than 0.05%, the effect is not obtained. When the Cr content exceeds 0.30%, giant intermetallic compounds are more likely to be formed, resulting in deteriorated plasticity. The Cr content is preferably 0.10 to 0.20%.

V:

V may be contained because V improves the strength through solid solution strengthening and improves corrosion resistance. The V content is 0.05 to 0.30%. When the V content is less than 0.05%, the effect is not obtained. When the V content exceeds 0.30%, giant intermetallic compounds are more likely to be formed, resulting in deteriorated plasticity. The V content is preferably 0.10 to 0.20%.

At least one of these elements: Mg, Cu, Ti, Zr, Cr, and V may be added to the core material as may be necessary.

4. Sacrificial Anode Material

An aluminum alloy used for the sacrificial anode material contains Zn: 0.5 to 8.0%, Si: 0.05 to 1.50%, and Fe: 0.05 to 2.00% as essential elements, with the balance consisting of Al and inevitable impurities.

The sacrificial anode material may further contain, as selective added element(s), at least one selected from Ni: 0.05 to 2.00%, Mn: 0.05 to 2.00%, Mg: 0.05 to 3.00%, Ti: 0.05 to 0.30%, Zr: 0.05 to 0.30%, Cr: 0.05 to 0.30 mass %, and V: 0.05 to 0.30 mass %. In addition to the abovementioned essential elements and selective added elements, the sacrificial anode material may contain inevitable impurities of 0.05% or less for each impurity and 0.15% in total. The following describes the individual components.

Zn:

Zn can make the pitting potential less noble, and can improve corrosion resistance with the sacrificial protection effect by producing a potential difference relative to the core material. The Zn content is 0.5 to 8.0%. When the Zn content is less than 0.5%, the effect of improving corrosion resistance with the sacrificial protection effect is not obtained to a sufficient extent. When the Zn content exceeds 8.0%, corrosion is accelerated to destroy the sacrificial protection layer earlier, resulting in lower corrosion resistance. The Zn content is preferably 1.0 to 6.0%.

Si:

Si forms an Al—Fe—Si based intermetallic compound with Fe, or an Al—Fe—Mn—Si based intermetallic compound with Fe and Mn when Mn is simultaneously contained, to improve the strength through dispersion strengthening, or to form a solid solution in the aluminum matrix to improve the strength through solid solution strengthening. Si makes the potential of the sacrificial anode layer more noble, inhibiting the sacrificial protection effect to reduce the corrosion resistance. The Si content is 0.05 to 1.50%. When the Si content is less than 0.05%, an ingot of high-purity aluminum needs to be used, leading to higher cost. When the Si content exceeds 1.50%, Si makes the pitting potential of the sacrificial anode material more noble, losing the sacrificial protection effect to reduce the corrosion resistance. The Si content is preferably 0.10 to 1.20%.

Fe:

Fe forms an Al—Fe—Si based intermetallic compound with Si, or an Al—Fe—Mn—Si based intermetallic compound with Si and Mn when Mn is simultaneously contained, to improve the strength through dispersion strengthening. The Fe content is 0.05 to 2.00%. When the Fe content is less than 0.05%, an ingot of high-purity aluminum needs to be used, leading to higher cost. When the Fe content exceeds 2.00%, giant intermetallic compounds are more likely to be formed during casting, resulting in deteriorated plasticity. The Fe content is preferably 0.10 to 1.50%.

Ni:

Ni forms an Al—Ni based intermetallic compound, or an Al—Fe—Ni based intermetallic compound with Fe. These intermetallic compounds serve as a cathode site for corrosion because their corrosion potentials are much more noble than that of the aluminum matrix. Hence, when these intermetallic compounds are dispersed in the sacrificial anode material, starting points of corrosion are also dispersed. As a result, corrosion in the depth direction is inhibited, which means corrosion resistance is improved, and thus Ni may be contained. The Ni content is 0.05 to 2.00%. When the Ni content is less than 0.05%, the effect is not obtained to a sufficient extent. When the Ni content exceeds 2.00%, giant intermetallic compounds are more likely to be formed during casting, resulting in deteriorated plasticity. The Ni content is preferably 0.10 to 1.50%.

Mn:

Mn may be contained because Mn improves the strength and corrosion resistance. The Mn content is 0.05 to 2.00%. When the Mn content exceeds 2.00%, giant intermetallic compounds are more likely to be formed during casting, resulting in deteriorated plasticity. When the Mn content is less than 0.05%, the effect is not obtained to a sufficient extent. The Mn content is preferably 0.05 to 1.80%.

Mg:

Mg may be contained because Mg improves the strength of the sacrificial anode material through precipitation of $Mg_2Si$. In addition to improving the strength of the sacrificial anode material itself, Mg improves the strength of the core material by diffusing from the sacrificial anode material into the core material during brazing. For these reasons, Mg may be contained. The Mg content is 0.05 to 3.00%. When the Mg content is less than 0.05%, the effect is not obtained to a sufficient extent. When the Mg content exceeds 3.00%, it is difficult to press-bond the sacrificial anode material and the core material together during the hot clad rolling step. The Mg content is preferably 0.10 to 2.00%. Note that Mg degrades the flux for Nocolok brazing to deteriorate brazability. Thus, in the case where the sacrificial anode material contains 0.50% or more Mg, Nocolok brazing cannot be used for joining tubes together. In this case, welding or some other means needs to be used for joining tubes, for example.

Ti:

Ti may be contained because Ti improves the strength through solid solution strengthening and also improves corrosion resistance. The Ti content is 0.05 to 0.30%. When the Ti content is less than 0.05%, the effect is not obtained. When the Ti content exceeds 0.30%, giant intermetallic compounds are more likely to be formed, resulting in deteriorated plasticity. The Ti content is preferably 0.05 to 0.20%.

Zr:

Zr may be contained because Zr improves the strength through solid solution strengthening, while causing Al—Zr based intermetallic compounds to be precipitated so that coarse crystal grains are formed after brazing heating. The Zr content is 0.05 to 0.30%. When the Zr content is less than 0.05%, the effect is not obtained. When the Zr content exceeds 0.30%, giant intermetallic compounds are more likely to be formed, resulting in deteriorated plasticity. The Zr content is preferably 0.10 to 0.20%.

Cr:

Cr may be contained because Cr improves the strength through solid solution strengthening, while causing Al—Cr based intermetallic compounds to be precipitated so that coarse crystal grains are formed after brazing heating. The Cr content is 0.05 to 0.30%. When the Cr content is less than 0.05%, the effect is not obtained. When the Cr content exceeds 0.30%, giant intermetallic compounds are more likely to be formed, resulting in deteriorated plasticity. The Cr content is preferably 0.10 to 0.20%.

V:

V may be contained because V improves the strength through solid solution strengthening and improves corrosion resistance. The V content is 0.05 to 0.30%. When the V content is less than 0.05%, the effect is not obtained. When the V content exceeds 0.30%, giant intermetallic compounds are more likely to be formed, resulting in deteriorated plasticity. The V content is preferably 0.05 to 0.20%.

At least one of these elements: Ni, Mn, Mg, Ti, Zr, Cr, and V may be added to the sacrificial anode material as may be necessary.

5. Second Brazing Filler Metal

An aluminum alloy used for the second brazing filler metal contains Si: 2.5 to 13.0% and Fe: 0.05 to 1.20% as essential elements, with the balance consisting of Al and inevitable impurities.

The second brazing filler metal may further contain, as first selective added element(s), at least one selected from Mn: 0.05 to 2.00%, Cu: 0.05 to 1.50%, Ti: 0.05 to 0.30%, Zr: 0.05 to 0.30%, Cr: 0.05 to 0.30%, and V: 0.05 to 0.30%. The second brazing filler metal may further contain, as second selective added element(s), at least one selected from Na: 0.001 to 0.050% and Sr: 0.001 to 0.050%. In addition to the above-mentioned essential elements and first and second selective added elements, the second brazing filler metal may contain inevitable impurities of 0.05% or less for each impurity and 0.15% in total. The following describes the individual components.

Si:

Addition of Si lowers the melting point of the second brazing filler metal to generate a liquid phase, allowing the brazing to be carried out. The Si content is 2.5 to 13.0%. When the Si content is less than 2.5%, the liquid phase is generated only to a small extent and the brazing function is difficult to obtain. When the Si content exceeds 13.0%, an excessive amount of Si is diffused to a counterpart member, such as a fin, causing the counterpart member to melt, if the second brazing filler metal is used for a tube, for example. The Si content is preferably 3.5 to 12.0%.

Fe:

Since Fe tends to form an Al—Fe based or Al—Fe—Si based intermetallic compound, or an Al—Fe—Mn based or Al—Fe—Mn—Si based intermetallic compound when Mn is simultaneously contained, Fe may reduce the amount of Si effective in brazing to deteriorate brazability. The Fe content is 0.05 to 1.20%. When the Fe content is less than 0.05%, an ingot of high-purity aluminum needs to be used, leading to higher cost. When the Fe content exceeds 1.20%, the amount of Si effective in brazing is reduced, resulting in insufficient brazing. The Fe content is preferably 0.10 to 0.50%.

Mn:

Mn may be contained because Mn improves the strength of brazing filler metals and corrosion resistance. The Mn content is 0.05 to 2.00%. When the Mn content exceeds 2.00%, giant intermetallic compounds are more likely to be formed during casting, resulting in deteriorated plasticity. When the Mn content is less than 0.05%, the effect is not obtained to a sufficient extent. The Mn content is preferably 0.05 to 1.80%.

Cu:

Cu may be contained because Cu improves the strength of the second brazing filler metal through solid solution strengthening. The Cu content is 0.05 to 1.50%. When the Cu content is less than 0.05%, the effect is not exerted sufficiently. When the Cu content exceeds 1.50%, the aluminum alloy is more likely to crack during casting. The Cu content is preferably 0.30 to 1.00%.

Ti:

Ti may be contained because Ti improves the strength of the second brazing filler metal through solid solution strengthening and also improves corrosion resistance. The Ti content is 0.05 to 0.30%. When the Ti content is less than 0.05%, the effect is not obtained. When the Ti content exceeds 0.30%, giant intermetallic compounds are more likely to be formed, resulting in deteriorated plasticity. The Ti content is preferably 0.10 to 0.20%.

Zr:

Zr may be contained because Zr improves the strength of the second brazing filler metal through solid solution strengthening, while causing Al—Zr based intermetallic compounds to be precipitated so that coarse crystal grains are formed after brazing heating. The Zr content is 0.05 to 0.30%. When the Zr content is less than 0.05%, the effect is not obtained. When the Zr content exceeds 0.30%, giant intermetallic compounds are more likely to be formed, resulting in deteriorated plasticity. The Zr content is preferably 0.10 to 0.20%.

Cr:

Cr may be contained because Cr improves the strength of the second brazing filler metal through solid solution strengthening, while causing Al—Cr based intermetallic compounds to be precipitated so that coarse crystal grains are formed after brazing heating. The Cr content is 0.05 to 0.30%. When the Cr content is less than 0.05%, the effect is not obtained. When the Cr content exceeds 0.30%, giant intermetallic compounds are more likely to be formed, resulting in deteriorated plasticity. The Cr content is preferably 0.10 to 0.20%.

V:

V may be contained because V improves the strength of the second brazing filler metal through solid solution strengthening and also improves corrosion resistance. The V content is 0.05 to 0.30%. When the V content is less than 0.05%, the effect is not obtained. When the V content exceeds 0.30%, giant intermetallic compounds are more likely to be formed, resulting in deteriorated plasticity. The V content is preferably 0.10 to 0.20%.

Na and Sr:

Na and Sr each exert the effect of making Si particles in the second brazing filler metal finer. Each of the Na content and the Sr content is 0.001 to 0.050%. When the Na content or Sr content is less than 0.001%, the effect is not obtained to a sufficient extent. When the Na content or Sr content exceeds 0.050%, a thicker oxide film is created, resulting in deteriorated brazability. The Na content and Sr content each are preferably 0.003 to 0.020%.

At least one of these elements: Mn, Cu, Ti, Zr, Cr, V, Na, and Sr may be added to the second brazing filler metal as may be necessary.

6. Structure of First Brazing Filler Metal

Limitations are imposed on the first brazing filler metal in the aluminum alloy clad material according to the present disclosure as follows. The existence density of Al—Mn based intermetallic compounds having a circle-equivalent diameter of 0.1 μm or larger before brazing heating is limited to at least $1.0 \times 10^5$ pieces/mm$^2$, while the existence density of Al—Mn based intermetallic compounds having a circle-equivalent diameter of 2 μm or larger after the brazing heating is limited to at least 300 pieces/mm$^2$. These limitations are intended to improve corrosion resistance on the surface of the first brazing filler metal side after the brazing heating. The existence density, as used herein, refers to a number density per unit area, as observed on an arbitrary cross section of the first brazing filler metal layer. Reasons for the limitations are described below.

The first brazing filler metal is clad on the core material for the purposes of enabling the materials to be joined together during brazing by melting and supplying part of the brazing filler metal, and of achieving the sacrificial protection feature to prevent perforation corrosion in a tube by causing preferential corrosion in the first brazing filler metal itself to develop planar corrosion. However, as described above, when the form of corrosion is no longer pitting corrosion, local alkalization occurs, and then the sacrificial protection feature is disabled and corrosion perforation occurs in an early stage. After conducting intensive studies on this problem, the inventors have found that corrosion perforation due to local alkalization can be prevented by having Al—Mn based intermetallic compounds in appropriate size (circle-equivalent diameter) and density diffused into the first brazing filler metal after brazing, so that the cathodic reaction is activated when corrosion is in progress to facilitate development of pitting corrosion.

After brazing, Al—Mn based intermetallic compounds having a circle-equivalent diameter of 2 µm or larger exert the effect of activating the cathodic reaction, whereas those having a circle-equivalent diameter less than 2 µm do not exert the effect sufficiently. Accordingly, the present disclosure excludes an Al—Mn based intermetallic compound having a circle-equivalent diameter less than 2 µm after brazing. In addition, after brazing, Al—Mn based intermetallic compounds having a circle-equivalent diameter of 2 µm or larger sufficiently exert the effect of activating the cathodic reaction if the existence density of the intermetallic compounds is at least 300/mm$^2$, while the effect is insufficient if the existence density is less than 300/mm$^2$. The circle-equivalent diameter and the existence density of Al—Mn based intermetallic compounds after brazing are preferably at least 3 µm and at least 1,000/mm$^2$, respectively. From the viewpoint of corrosion resistance, no upper limit is imposed on the circle-equivalent diameter of Al—Mn intermetallic compounds after the brazing. However, any compound larger than 200 µm may deteriorate plasticity and the material may crack when rolled. For this reason, the upper limit of a circle-equivalent diameter is preferably set to 200 µm. From the viewpoint of corrosion resistance, no upper limit is imposed on the existence density of Al—Mn based intermetallic compounds. However, alloy compositions and production methods of the present disclosure make it difficult to have Al—Mn based intermetallic compounds with the existence density greater than $5.0 \times 10^5$ pieces/mm$^2$. Thus, the upper limit of existence density is set to $5.0 \times 10^5$ pieces/mm$^2$.

In order to obtain Al—Mn based intermetallic compounds having the above-described circle-equivalent diameter and density distribution after brazing, the Al—Mn based intermetallic compounds have to be controlled before the brazing in terms of circle-equivalent diameter and density distribution. Al—Mn based intermetallic compounds having a circle-equivalent diameter of 0.1 µm or larger before brazing do not dissolve in the matrix during the brazing, and can form Al—Mn based compounds having a circle-equivalent diameter of 2 µm or larger after the brazing. Al—Mn based intermetallic compounds having a circle-equivalent diameter of less than 0.1 µm before brazing dissolve in the matrix or become smaller during the brazing, failing to form Al—Mn based compounds having a circle-equivalent diameter of 2 µm or larger after the brazing. Accordingly, the present disclosure excludes an Al—Mn based intermetallic compound having a circle-equivalent diameter of less than 0.1 µm before brazing.

The circle-equivalent diameter of an Al—Mn based intermetallic compound existing before brazing is preferably 0.2 µm or larger. If Al—Mn based intermetallic compounds with a circle-equivalent diameter of 0.1 µm or larger before the brazing have an existence density of at least $1 \times 10^5$ pieces/mm$^2$, there can be Al—Mn intermetallic compounds with a circle-equivalent diameter of 2 µm or larger and with an existence density of at least 300 pieces/mm$^2$ after the brazing. If the existence density of Al—Mn based intermetallic compounds having a circle-equivalent diameter of 0.1 µm or larger before brazing is less than $1.0 \times 10^5$ pieces/mm$^2$, Al—Mn intermetallic compounds having a circle-equivalent diameter of 2 µm or larger after the brazing cannot exist with an existence density of at least 300 pieces/mm$^2$. The existence density of Al—Mn based compounds having a circle-equivalent diameter of 0.1 µm or larger before brazing is preferably at least $3.0 \times 10^5$ pieces/mm$^2$. From the viewpoint of corrosion resistance, no upper limit is imposed on the circle-equivalent diameter of Al—Mn intermetallic compounds before brazing. However, any compound larger than 200 µm may deteriorate plasticity and the material may crack when rolled. Accordingly, the upper limit of a circle-equivalent diameter is preferably set to 200 µm. From the viewpoint of corrosion resistance, no upper limit is imposed on the existence density of Al—Mn based compounds. However, alloy compositions and production methods of the present disclosure make it difficult to have Al—Mn based compounds with the existence density greater than $5.0 \times 10^7$ pieces/mm$^2$. Accordingly, the upper limit of existence density is set to $5.0 \times 10^7$ pieces/mm$^2$.

7. Method for Producing Aluminum Alloy Clad Material 7-1. Production Steps

A method for producing the aluminum alloy clad material according to the present disclosure includes: the step of casting aluminum alloys for the core material and for the first brazing filler metal respectively; the step of hot rolling an ingot of the cast first brazing filler metal to a predetermined thickness; the cladding step of cladding the first brazing filler metal that has been hot rolled to a predetermined thickness on one surface or both surfaces of the core material ingot; the hot clad rolling step of hot rolling the clad material; the cold rolling step of cold rolling the clad material that has undergone the hot clad rolling; and the annealing step of annealing at least once the clad material either or both of during the cold rolling step and after the cold rolling step. In the case where the first brazing filler metal is clad on only one surface of the core material, the second brazing filler metal or the sacrificial anode material that has been hot rolled to a predetermined thickness is clad on the other surface of the core material.

The aluminum alloy clad material of the present disclosure achieves excellent corrosion resistance owing to control of the structure of the first brazing filler metal. After conducting intensive studies, the inventors have found that the most influential production step in controlling the structure is the step of hot rolling the first brazing filler metal that has been cast. The following describes how the step of hot rolling the first brazing filler metal is controlled.

7-2. Step of Hot Rolling First Brazing Filler Metal

The method for producing the aluminum alloy clad material according to the present disclosure is distinctive in the step of hot rolling the first brazing filler metal to a predetermined thickness for the purpose of achieving a desired clad ratio, after the step of casting the first brazing filler metal. The hot rolling step includes a stage of heating an ingot, a subsequent stage of holding the ingot, and a stage of hot rolling the ingot that has been heated and held. The rate of temperature rise up to 400° C. in the heating stage is set to 30° C./h or higher, and the rate of temperature rise from 400° C. up to the holding temperature in the holding stage is set to 60° C./h or lower. For the holding stage, the holding temperature is set to a temperature between 450 and 560° C. inclusive and the holding time is set to one hour or longer. For the hot rolling stage, the time period during which the rolled material is at a temperature of 400° C. or higher is set to 5 minutes or longer. Conditions for the step of hot rolling the first brazing filler metal are defined as above. As a result, the aluminum alloy clad material according to the present disclosure provides, before and after brazing, the distribution of Al—Mn based intermetallic compounds as defined according to the present disclosure, thereby achieving excellent corrosion resistance after the brazing. Reasons for this achievement are described below.

During the step of casting the first brazing filler metal, a large amount of Mn forms a solid solution in the matrix of the ingot. Such large amount of Mn forming a solid solution in the matrix is precipitated as a lot of Al—Mn based intermetallic compounds during the heating stage prior to the rolling stage in the hot rolling step. These Al—Mn based intermetallic compounds mostly determine the structure of the first brazing filler metal in the aluminum alloy clad material before brazing. As described above, in order that Al—Mn based intermetallic compounds remain in a size effective to provide corrosion resistance after brazing, the Al—Mn based intermetallic compounds need to have a circle-equivalent diameter of 0.1 μm or larger before the brazing. During the heating stage prior to the rolling stage in the hot rolling step, relatively small precipitates of Al—Mn intermetallic compounds are generated until the ingot of the first brazing filler metal is heated to 400° C., while relatively large precipitates of Al—Mn intermetallic compounds are generated after the ingot is heated to 400° C.

If the rate of temperature rise up to 400° C. is less than 30° C./h during the heating stage prior to the rolling stage in the hot rolling step, a large number of precipitates of relatively small Al—Mn based intermetallic compounds are generated. As a result, the desired precipitate distribution of Al—Mn based intermetallic compounds cannot be obtained. If the rate of temperature rise from 400° C. up to the holding temperature for the holding stage exceeds 60° C./h, a small number of precipitates of relatively large Al—Mn based intermetallic compounds are generated. As a result, the desired precipitate distribution of Al—Mn based intermetallic compounds cannot be obtained. If the holding temperature is lower than 450° C. during the holding stage, a small number of precipitates of relatively large Al—Mn based intermetallic compounds are generated. As a result, the desired precipitate distribution of Al—Mn based intermetallic compounds cannot be obtained. If the holding time is shorter than one hour, a small number of participates of relatively large Al—Mn based intermetallic compounds are generated. As a result, the desired precipitate distribution of Al—Mn based intermetallic compounds cannot be obtained.

The rate of temperature rise up to 400° C. is preferably 40° C./h or higher, while the rate of temperature rise from 400° C. up to the holding temperature for the holding stage is preferably 50° C./h or lower. The holding temperature for the holding stage is preferably 460° C. or higher, and the holding time is preferably 2 hours or longer.

From the viewpoint of corrosion resistance, no specific upper limit is imposed on the aforementioned rate of temperature rise up to 400° C. However, in terms of heat capacity of an ingot, there is difficulty in having a rate of temperature rise higher than 100° C./h. Accordingly, the upper limit of the rate of temperature rise is set to 100° C./h in the present disclosure. From the viewpoint of corrosion resistance, no specific lower limit is imposed on the rate of temperature rise from 400° C. up to the holding temperature for the holding stage. However, a rate of temperature rise lower than 20° C./h involves an extremely long time to raise temperature, significantly impairing cost effectiveness. Accordingly, the lower limit of the rate of temperature rise is set to 20° C./h in the present disclosure. If the holding temperature for the holding stage exceeds 560° C., the first brazing filler metal may melt, failing to produce the clad material. Accordingly, the upper limit of the holding temperature is set to 560° C. From the viewpoint of corrosion resistance, no specific upper limit is imposed on the aforementioned holding time. However, a holding time longer than 20 hours significantly impairs cost effectiveness. Accordingly, the upper limit of the holding time is preferably set to 20 hours.

The time required for the hot rolling stage is shorter than the preceding heating and holding stages. However, the strain introduced in this hot rolling stage facilitates precipitation of intermetallic compounds. That is, during the hot rolling stage, precipitates of relatively large Al—Mn based intermetallic compounds are generated in spite of a short rolling time. If the time period during which the first brazing filler metal is at 400° C. or higher is shorter than 5 minutes in the hot rolling stage, a small number of precipitates of relatively large Al—Mn based intermetallic compounds are generated. As a result, the desired precipitate distribution of Al—Mn based intermetallic compounds cannot be obtained.

During the hot rolling stage, the time period during which the first brazing filler metal is at 400° C. or higher is preferably 7 minutes or longer. From the viewpoint of corrosion resistance, no specific upper limit is imposed on the time period. However, in terms of heat capacity of an ingot, there is difficulty in keeping the ingot at a temperature of 400° C. or higher for more than 30 minutes. Accordingly, the upper limit of the time period is set to 30 minutes in the present disclosure. As long as the first brazing filler metal is at a temperature lower than 400° C. during the hot rolling stage, very few precipitates are generated, and thus the time period need not be controlled.

The above-described steps exert a greater influence on corrosion resistance. The following describes preferable production conditions for the steps other than the step of hot rolling the first brazing filler metal.

7-3. Casting Step and Hot Rolling Step

No specific limitation is imposed on conditions for the step of casing the first brazing filler metal, the core material, the second brazing filler metal, and the sacrificial anode material. However, the casting step is usually performed by using a water-cooled semi-continuous casting method. The hot rolling steps of hot rolling the second brazing filler metal and the sacrificial anode material to their predetermined thicknesses include a heating and holding stage and a hot rolling stage. As heating conditions for the heating and holding stage, the material is heated preferably at 400 to 560° C. for 5 to 10 hours in general, and more preferably at 420 to 540° C. for 0.5 to 8 hours. If the temperature is lower than 400° C., the material may crack on its edge during the rolling because of poor plasticity. If the temperature is higher than 560° C., the ingot may melt during the heating. If the heating time is shorter than 0.5 hours, the ingot temperature may not become uniform. If the heating time is longer than 10 hours, cost effectiveness is significantly impaired.

7-4. Homogenizing Treatment Step

The ingot obtained by casting the core material may be subjected to a homogenizing treatment step before the hot clad rolling step. The homogenizing treatment step is carried out preferably at 450 to 620° C. for 1 to 24 hours in general, and more preferably at 480 to 620° C. for 1 to 20 hours. If the temperature is lower than 450° C. or the time is shorter than one hour, the resulting homogenizing effect may be insufficient. If the temperature is higher than 620° C., the core material ingot may melt. If the time is longer than 24 hours, cost effectiveness is significantly impaired.

7-5. Hot Clad Rolling Step

During the hot clad rolling step, the clad material is heated in the heating stage prior to the clad rolling stage. The heating is carried out preferably at 400 to 560° C. for 0.5 to 10 hours in general, and more preferably at 420 to 540° C. for 0.5 to 8 hours. If the temperature is lower than 400° C., the material may crack on its edge during the clad rolling because of poor plasticity. If the temperature is higher than 560° C., the ingot may melt during the heating. If the time is shorter than 0.5 hours, the clad material temperature may not become uniform. If the time is longer than 10 hours, cost effectiveness is significantly impaired. The hot clad rolling step may be divided into two steps carried out in series: a rough rolling step with a rolling reduction of 70 to 95% and a finish rolling step with a rolling reduction of 70 to 95%.

7-6. Cold Rolling Step and Annealing Step

The annealing step is carried out during or after the cold rolling step or during and after the cold rolling step for the purpose of improving formability, for example. Specifically, (1) at least one intermediate annealing step is performed during the cold rolling step; (2) a final annealing step is performed once after the cold rolling step; or (3) both steps described in (1) and (2) are performed. During the annealing step, the clad material is held preferably at 200 to 560° C. for 1 to 10 hours. If the temperature is lower than 200° C. and the holding time is shorter than one hour, the aforementioned effect may not be exerted sufficiently. If the temperature is higher than 560° C., the clad material may melt during heating. If the holding time is longer than 10 hours, cost effectiveness is significantly impaired. More preferable annealing conditions include a temperature of 230 to 500° C. and a holding time of 1 to 8 hours. No specific upper limit is imposed on the number of annealing steps. However, the number of annealing steps is preferably set to three so as to avoid a cost increase caused by a larger number of steps.

8. Clad Ratio and Thickness

Each of the first brazing filler metal, the second brazing filler metal, and the sacrificial anode material included in the aluminum alloy clad material according to the present disclosure preferably has a clad ratio (single side) of 3 to 25%. When any of these materials has a clad ratio lower than 3%, which means the clad material is too thin, the material may fail to cover the whole core material during the hot clad rolling. When any of these materials has a clad ratio higher than 25%, warpage may occur during the hot clad rolling, failing to produce the clad material. More preferably, each clad ratio is 5 to 20%.

No specific limit is imposed on the thickness of the aluminum alloy clad material according to the present disclosure. However, the clad material having a thickness of 0.15 to 0.6 mm is usually used for, for example, a passage forming component for a heat exchanger, which is described below. Alternatively, the clad material having a thickness of about 0.6 to 3 mm can be used for a header plate, for example.

9. Heat Exchanger

The aluminum alloy clad material according to the present disclosure is suitably used as a heat exchanger member, such as a passage forming component, a header plate, or a fin material. More particularly, the aluminum alloy clad material is suitably used as a passage forming component. The passage forming component where cooling water or some other medium flows can be produced by, for example, bending and forming the aluminum alloy clad material, and joining both overlapping ends of the material through brazing. The heat exchanger according to the present disclosure is structured to include, for example, the aforementioned passage forming component, a fin material, and a header plate, which are assembled and joined together through one-time brazing.

The heat exchanger is assembled by attaching either end of the passage forming component to the header plate and placing the fin material on an outer surface of the passage forming component. Then, one-time brazing heating is performed to simultaneously join overlapping ends of the passage forming component, the fin material and the outer surface of the passage forming component, and the header plate and either end of the passage forming component. Examples of a brazing method include fluxless brazing, Nocolok brazing, and vacuum brazing, among which Nocolok brazing is preferable. Brazing is usually performed by heating the material at 590 to 610° C. for 2 to 10 minutes, preferably at 590 to 610° C. for 2 to 6 minutes. After subjected to brazing, the material is usually cooled at a cooling rate of 20 to 500° C./minute.

10. Corrosive Environment

The aluminum alloy clad material according to the present disclosure is used as at least a passage forming component for a heat exchanger. The following describes a corrosive environment in which the aluminum alloy clad material can fully exhibit its advantage in terms of corrosion resistance when serving as a passage forming component for a heat exchanger.

As described above, in the case where tap water or well water is used as cooling water that flows through a heat exchanger, chloride ions are contained therein usually at a low concentration of 1,200 ppm or less. In a hotter environment, therefore, corrosion will be in a form different from pitting corrosion, making it difficult to exert the sacrificial protection effect. As a result, local alkalization may occur in a corrosive region where aluminum oxide or aluminum hydroxide is generated, resulting in severe corrosion. For the purpose of solving the technical problem of reducing such phenomenon, the aluminum alloy clad material according to the present disclosure has been developed and accomplished. Specifically, the present disclosure exhibits its advantage in a corrosive environment where chloride ions are present at a concentration of 1,200 ppm or less and local alkalization is likely to occur. In a corrosive environment where chloride ions are present at a concentration of greater than 1,200 ppm, the form of corrosion remains unchanged from pitting corrosion and the sacrificial protection remains effective even in a hot environment. As a result, local alkalization is less likely to occur, and thus the advantage of the present disclosure is not fully exhibited. When chloride ions are present at a concentration of less than 5 ppm, the present disclosure does not notably exhibit the advantage because there occurs no corrosion pit. The aluminum alloy clad material according to the present disclosure can exhibit the advantage regarding corrosion in an environment where chloride ions are present at a concentration of 1,200 ppm or less. In particular, the advantage of the present disclosure is exhibited in a corrosive environment where chloride ions are present preferably at a concentration of 5 to 1,000 ppm, and more preferably at a concentration of 10 to 800 ppm. As described above, in a heat exchanger according to the present disclosure, the aluminum alloy clad material according to the present disclosure is used as at least a passage forming component. In the case where the first brazing filler metal is used on both surfaces of the core material, at least one of the surfaces of the first brazing filler metals is exposed to a solution containing chloride ions at a concentration of 1,200 ppm or less. In the case where the first brazing filler metal is used on one surface of the core material, the surface of the first brazing filler metal is exposed to a solution containing chloride ions at a concentration of 1,200 ppm or less.

EXAMPLES

The present disclosure will now be described in more detail on the basis of Examples of the present disclosure and Comparative Examples, but the present disclosure is not limited to the Examples.

First brazing filler metal alloys, core material alloys, second brazing filler metal alloys, and sacrificial anode material alloys, whose alloy compositions are listed in Table 1, Table 2, Table 3, and Table 4, respectively, were each cast into an ingot through DC casting, and finished by facing both surfaces. Each ingot after the facing had a thickness of 400 mm. For the first brazing filler metals, the second brazing filler metals, and the sacrificial anode materials, clad ratios satisfying the desired final thickness were calculated, and, to obtain the required combined thickness based on the clad ratios, these materials were each subjected to a heating stage at 480° C. for 3 hours and then to a hot rolling stage until reaching a predetermined thickness. Table 5 shows conditions used for the step of hot rolling the first brazing filler metals. The second brazing filler metals and the sacrificial anode materials were each hot rolled by using the conditions listed in E1 in Table 5.

TABLE 1

| | Alloy Symbol | Alloy Composition (mass %) | | | | | | | | | | |
|---|---|---|---|---|---|---|---|---|---|---|---|---|
| | | Si | Fe | Cu | Mn | Zn | Ti | Zr | Cr | V | Na | Sr | Al |
| Example of the Present Disclosure | A1 | 5.0 | 0.20 | — | 0.5 | 3.0 | — | — | — | — | — | — | Balance |
| | A2 | 2.5 | 0.20 | — | 0.5 | 3.0 | 0.05 | — | — | — | 0.001 | — | Balance |
| | A3 | 7.0 | 0.20 | — | 0.5 | 3.0 | — | 0.05 | — | — | — | 0.001 | Balance |
| | A4 | 5.0 | 0.05 | — | 0.5 | 3.0 | — | — | 0.05 | — | 0.050 | — | Balance |
| | A5 | 5.0 | 1.20 | — | 0.5 | 3.0 | — | — | — | 0.05 | — | 0.050 | Balance |
| | A6 | 5.0 | 0.20 | 0.05 | 0.5 | 3.0 | 0.30 | 0.30 | 0.30 | 0.30 | — | — | Balance |
| | A7 | 5.0 | 0.20 | 0.60 | 0.5 | 3.0 | — | — | — | — | — | — | Balance |
| | A8 | 5.0 | 0.20 | — | 0.3 | 3.0 | — | — | — | — | — | — | Balance |
| | A9 | 5.0 | 0.20 | — | 2.0 | 3.0 | — | — | — | — | — | — | Balance |
| | A10 | 5.0 | 0.20 | — | 0.5 | 0.5 | — | — | — | — | — | — | Balance |
| | A11 | 5.0 | 0.20 | — | 0.5 | 8.0 | — | — | — | — | — | — | Balance |
| Comparative Example | A12 | 2.0 | 0.20 | — | 0.5 | 3.0 | — | — | — | — | — | — | Balance |
| | A13 | 14.0 | 0.20 | — | 0.5 | 3.0 | — | — | — | — | — | — | Balance |
| | A14 | 5.0 | 1.40 | — | 0.5 | 3.0 | — | — | — | — | — | — | Balance |
| | A15 | 5.0 | 0.20 | 0.70 | 0.5 | 3.0 | — | — | — | — | — | — | Balance |
| | A16 | 5.0 | 0.20 | — | 0.2 | 3.0 | — | — | — | — | — | — | Balance |
| | A17 | 5.0 | 0.20 | — | 2.2 | 3.0 | — | — | — | — | — | — | Balance |
| | A18 | 5.0 | 0.20 | — | 0.5 | 3.0 | 0.40 | 0.40 | 0.40 | 0.40 | — | — | Balance |
| | A19 | 5.0 | 0.20 | — | 0.5 | 3.0 | — | — | — | — | 0.060 | — | Balance |
| | A20 | 5.0 | 0.20 | — | 0.5 | 3.0 | — | — | — | — | — | 0.060 | Balance |
| | A21 | 5.0 | 0.20 | — | 0.5 | 0.4 | — | — | — | — | — | — | Balance |
| | A22 | 5.0 | 0.20 | — | 0.5 | 9.0 | — | — | — | — | — | — | Balance |

TABLE 2

| | Alloy Symbol | Alloy Composition (mass %) | | | | | | | | | |
|---|---|---|---|---|---|---|---|---|---|---|---|
| | | Si | Fe | Cu | Mn | Mg | Ti | Zr | Cr | V | Al |
| Example of the Present Disclosure | B1 | 0.50 | 0.20 | — | 1.1 | — | — | — | — | — | Balance |
| | B2 | 0.50 | 0.20 | — | 1.1 | 0.50 | 0.05 | — | — | — | Balance |
| | B3 | 0.50 | 0.20 | — | 1.5 | 0.05 | — | 0.05 | — | — | Balance |
| | B4 | 0.05 | 2.00 | — | 1.1 | — | — | — | 0.05 | — | Balance |
| | B5 | 1.50 | 0.05 | 0.05 | 0.5 | — | — | — | — | 0.05 | Balance |
| | B6 | 0.50 | 0.20 | — | 2.0 | — | 0.30 | 0.30 | 0.30 | 0.30 | Balance |
| | B7 | 1.20 | 0.20 | 0.05 | 1.1 | — | — | — | — | — | Balance |
| | B8 | 0.50 | 0.20 | 1.50 | 1.1 | — | — | — | — | — | Balance |
| Comparative Example | B9 | 1.60 | 0.20 | — | 1.1 | — | — | — | — | — | Balance |
| | B10 | 0.50 | 0.20 | — | 1.1 | 0.60 | — | 0.15 | — | — | Balance |
| | B11 | 0.50 | 2.20 | — | 1.5 | — | 0.15 | 0.15 | — | — | Balance |
| | B12 | 0.50 | 0.20 | — | 1.5 | — | 0.40 | 0.40 | 0.40 | 0.40 | Balance |
| | B13 | 0.50 | 0.20 | — | 2.2 | — | — | — | — | — | Balance |
| | B14 | 0.50 | 0.20 | 1.60 | 1.1 | — | — | — | — | — | Balance |
| | B15 | 0.50 | 0.20 | — | 0.4 | — | 0.05 | 0.05 | — | — | Balance |

TABLE 3

| | Alloy Symbol | Alloy Composition (mass %) | | | | | | | | | | | |
|---|---|---|---|---|---|---|---|---|---|---|---|---|---|
| | | Si | Fe | Cu | Mn | Zn | Ti | Zr | Cr | V | Na | Sr | Al |
| Example of the Present Disclosure | C1 | 10.0 | 0.20 | — | — | — | — | — | — | — | — | — | Balance |
| | C2 | 2.5 | 0.20 | — | — | — | 0.05 | — | — | — | 0.001 | — | Balance |
| | C3 | 13.0 | 0.20 | — | — | — | — | 0.05 | — | — | — | 0.001 | Balance |
| | C4 | 10.0 | 0.05 | — | — | — | — | — | 0.05 | — | 0.050 | — | Balance |
| | C5 | 10.0 | 1.20 | — | — | — | — | — | — | 0.05 | — | 0.050 | Balance |
| | C6 | 10.0 | 0.20 | 0.05 | — | — | 0.30 | 0.30 | 0.30 | 0.30 | — | — | Balance |
| | C7 | 10.0 | 0.20 | 1.50 | — | — | — | — | — | — | — | — | Balance |
| | C8 | 10.0 | 0.20 | — | 0.05 | — | — | — | — | — | — | — | Balance |
| | C9 | 10.0 | 0.20 | — | 2.00 | — | — | — | — | — | — | — | Balance |
| Comparative Example | C10 | 2.0 | 0.20 | — | — | — | — | — | — | — | — | — | Balance |
| | C11 | 14.0 | 0.20 | — | — | — | — | — | — | — | — | — | Balance |
| | C12 | 10.0 | 1.40 | — | — | — | — | — | — | — | — | — | Balance |
| | C13 | 10.0 | 0.20 | 1.60 | — | — | — | — | — | — | — | — | Balance |
| | C14 | 10.0 | 0.20 | — | 2.20 | — | — | — | — | — | — | — | Balance |
| | C15 | 10.0 | 0.20 | — | — | — | 0.40 | 0.40 | 0.40 | 0.40 | — | — | Balance |
| | C16 | 10.0 | 0.20 | — | — | — | — | — | — | — | 0.060 | — | Balance |
| | C17 | 10.0 | 0.20 | — | — | — | — | — | — | — | — | 0.060 | Balance |

TABLE 4

| | Alloy Symbol | Alloy Composition (mass %) | | | | | | | | | | |
|---|---|---|---|---|---|---|---|---|---|---|---|---|
| | | Zn | Si | Fe | Mn | Mg | Ni | Ti | Zr | Cr | V | Al |
| Example of the Present Disclosure | D1 | 2.0 | 0.20 | 0.20 | — | — | — | — | — | — | — | Balance |
| | D2 | 0.5 | 0.05 | 0.05 | — | — | — | 0.05 | — | — | — | Balance |
| | D3 | 8.0 | 0.20 | 0.20 | — | — | — | 0.30 | 0.30 | 0.30 | 0.30 | Balance |
| | D4 | 2.0 | 1.50 | 0.20 | — | — | — | — | 0.05 | — | — | Balance |
| | D5 | 2.0 | 0.20 | 2.00 | — | — | — | — | — | 0.05 | — | Balance |
| | D6 | 2.0 | 0.20 | 0.20 | 0.05 | — | — | — | — | — | 0.05 | Balance |
| | D7 | 2.0 | 0.20 | 0.20 | 2.00 | — | — | — | — | — | — | Balance |
| | D8 | 2.0 | 0.20 | 0.20 | — | — | 0.05 | — | — | — | — | Balance |
| | D9 | 2.0 | 0.20 | 0.20 | — | — | 2.00 | — | — | — | — | Balance |
| | D10 | 2.0 | 0.20 | 0.20 | — | 0.05 | — | — | — | — | — | Balance |
| | D11 | 2.0 | 0.20 | 0.20 | — | 3.00 | — | — | — | — | — | Balance |
| Comparative Example | D12 | 2.0 | 1.60 | 0.20 | — | — | — | — | — | — | — | Balance |
| | D13 | 2.0 | 0.20 | 2.20 | — | — | — | — | — | — | — | Balance |
| | D14 | 2.0 | 0.20 | 0.20 | — | — | — | 0.40 | 0.40 | 0.40 | 0.40 | Balance |
| | D15 | 0.4 | 0.20 | 0.20 | — | — | — | — | — | — | — | Balance |
| | D16 | 9.0 | 0.20 | 0.20 | — | — | — | — | — | — | — | Balance |
| | D17 | 2.0 | 0.20 | 0.20 | — | — | 2.20 | — | — | — | — | Balance |
| | D18 | 2.0 | 0.20 | 0.20 | 2.20 | — | — | — | — | — | — | Balance |
| | D19 | 2.0 | 0.20 | 0.20 | — | 3.20 | — | — | — | — | — | Balance |

TABLE 5

| | | Temperature Rise Rate in Heating Stage | | Holding Stage | | Hot Rolling Stage | | Cold Rolling and Subsequent Steps |
|---|---|---|---|---|---|---|---|---|
| | | Up to 400° C. (° C./h) | From 400° C. to Holding Temp. (° C./h) | Holding Temp. (° C.) | Time (h) | Start Temp. (° C.) | Duration at 400° C. (min) | |
| Example of the Present Disclosure | E1 | 60 | 40 | 500 | 3 | 490 | 10 | 1 |
| | E2 | 30 | 40 | 500 | 10 | 490 | 10 | 3 |
| | E3 | 100 | 60 | 500 | 3 | 490 | 30 | 2 |
| | E4 | 60 | 20 | 450 | 3 | 440 | 7 | 1 |
| | E5 | 60 | 40 | 500 | 1 | 490 | 10 | 3 |
| | E6 | 60 | 40 | 560 | 3 | 490 | 5 | 2 |
| Comparative Example | E7 | 25 | 40 | 500 | 3 | 490 | 10 | 1 |
| | E8 | 60 | 65 | 500 | 3 | 490 | 10 | 3 |
| | E9 | 60 | 40 | 440 | 3 | 430 | 6 | 2 |
| | E10 | 60 | 40 | 500 | 0.5 | 490 | 10 | 1 |
| | E11 | 60 | 40 | 500 | 3 | 490 | 4 | 3 |
| | E12 | 60 | 40 | 580 | 3 | — | — | — |

By using these alloys, the core alloy was combined with first brazing filler metals listed in Table 1 on one surface of the core alloy. On the other surface, the core alloy was combined with nothing, or with first brazing filler metals in Table 1, second brazing filler metals in Table 3, or sacrificial anode materials in Table 4. Tables 6 to 9 show combinations of a first brazing filler metal, a core material, a second brazing filler metal, and a sacrificial anode material, listed by sample. Clad ratios of the first brazing filler metal, the second brazing filler metal, and the sacrificial anode material were each set to 10% (single side). These combined materials were subjected to the hot clad rolling step. That is, each clad material was heated and held at 500° C. for 3 hours in the heating stage, and then to the clad rolling stage, so that a two-layer or three-layer clad material being 3 mm in thickness was produced. Then, a clad material sample being 0.4 mm in final thickness was produced by using the steps in one of the orders as indicated under "Cold Rolling and Subsequent Steps" in Table 5: (1) cold rolling, intermediate annealing, and then final cold rolling; (2) cold rolling, and then final annealing; or (3) cold rolling, intermediate annealing, final cold rolling, and then final annealing. The intermediate annealing and final annealing steps were carried out under the conditions: 370° C. for 2 hours. For each sample, the rolling reduction in the final cold rolling after the intermediate annealing was set to 30%. Combinations of steps are listed in Table 5.

TABLE 6

| | | Alloy | | | | Brazability | | | Tensile Strength after Brazing |
|---|---|---|---|---|---|---|---|---|---|
| | No. | 1st Brazing Filler Metal | Core Material | 2nd Brazing Filler Material/ Sacrificial Anode Material | Step | Manu-factur-ability | 1st Brazing Filler Metal | 2nd Brazing Filler Metal | Heating Measure-men (MA) |
| Example of the Present Disclosure | 1 | A1 | B1 | C1 | E1 | ○ | ○ | ○ | 142 |
| | 2 | A2 | B2 | C2 | E1 | ○ | ○ | ○ | 179 |
| | 3 | A3 | B3 | C3 | E1 | ○ | ○ | ○ | 148 |
| | 4 | A4 | B4 | C4 | E1 | ○ | ○ | ○ | 142 |
| | 5 | A5 | B5 | C5 | E1 | ○ | ○ | ○ | 160 |
| | 6 | A6 | B6 | C6 | E1 | ○ | ○ | ○ | 149 |
| | 7 | A7 | B7 | C7 | E1 | ○ | ○ | ○ | 159 |
| | 8 | A8 | B8 | C8 | E1 | ○ | ○ | ○ | 188 |
| | 9 | A9 | B1 | C9 | E1 | ○ | ○ | ○ | 144 |
| | 10 | A10 | B1 | D1 | E1 | ○ | ○ | — | 141 |
| | 11 | A11 | B1 | D2 | E1 | ○ | ○ | — | 140 |
| | 12 | A1 | B1 | D3 | E1 | ○ | ○ | — | 139 |
| | 13 | A1 | B1 | D4 | E1 | ○ | ○ | — | 143 |
| | 14 | A1 | B1 | D5 | E1 | ○ | ○ | — | 141 |
| | 15 | A1 | B1 | D6 | E1 | ○ | ○ | — | 145 |
| | 16 | A1 | B1 | D7 | E1 | ○ | ○ | — | 148 |
| | 17 | A1 | B1 | D8 | E1 | ○ | ○ | — | 141 |
| | 18 | A1 | B1 | D9 | E1 | ○ | ○ | — | 142 |
| | 19 | A1 | B1 | D10 | E1 | ○ | ○ | — | 149 |
| | 20 | A1 | B1 | D11 | E1 | ○ | ○ | — | 155 |

| | | Tensile Strength after Brazing Heating Evalu-ations | Existence Density of Al-Mn Intermetallic Compounds having Circle-Equivalent Dia. ≥0.1 μm Before Brazing (pcs/mm$^2$) | Existence Density of Al-Mn Intermetallic Compounds having Circle-Equivalent Dia. ≥2 μm After Brazing (pcs/mm$^2$) | Corrosion Resistance | | | | |
|---|---|---|---|---|---|---|---|---|---|
| | | | | | 1st Brazing Filler Metal | | | | Sacrificial Anode Material |
| | No. | | | | Solution A | Solution B | Solution C | Solution D | |
| Example of the Present Disclosure | 1 | ○ | 15.0 × 10$^5$ | 3200 | ○ | ○ | ○ | ○ | — |
| | 2 | ○ | 12.0 × 10$^5$ | 2400 | ○ | ○ | ○ | ○ | — |
| | 3 | ○ | 17.0 × 10$^5$ | 3500 | ○ | ○ | ○ | ○ | — |
| | 4 | ○ | 16.0 × 10$^5$ | 3200 | ○ | ○ | ○ | ○ | — |
| | 5 | ○ | 14.0 × 10$^5$ | 3000 | ○ | ○ | ○ | ○ | — |
| | 6 | ○ | 16.0 × 10$^5$ | 3100 | ○ | ○ | ○ | ○ | — |
| | 7 | ○ | 18.0 × 10$^5$ | 4000 | ○ | ○ | ○ | ○ | — |
| | 8 | ○ | 2.0 × 10$^5$ | 350 | ○ | ○ | ○ | ○ | — |
| | 9 | ○ | 33.0 × 10$^5$ | 7100 | ○ | ○ | ○ | ○ | — |
| | 10 | ○ | 13.0 × 10$^5$ | 2600 | ○ | ○ | ○ | ○ | ○ |
| | 11 | ○ | 11.0 × 10$^5$ | 2200 | ○ | ○ | ○ | ○ | ○ |
| | 12 | ○ | 16.0 × 10$^5$ | 3600 | ○ | ○ | ○ | ○ | ○ |
| | 13 | ○ | 15.0 × 10$^5$ | 3700 | ○ | ○ | ○ | ○ | ○ |
| | 14 | ○ | 13.0 × 10$^5$ | 2800 | ○ | ○ | ○ | ○ | ○ |
| | 15 | ○ | 14.0 × 10$^5$ | 2100 | ○ | ○ | ○ | ○ | ○ |

TABLE 6-continued

| 16 | ○ | $14.0 \times 10^5$ | 2200 | ○ | ○ | ○ | ○ | ○ |
| 17 | ○ | $14.0 \times 10^5$ | 2800 | ○ | ○ | ○ | ○ | ○ |
| 18 | ○ | $16.0 \times 10^5$ | 3200 | ○ | ○ | ○ | ○ | ○ |
| 19 | ○ | $14.0 \times 10^5$ | 2800 | ○ | ○ | ○ | ○ | ○ |
| 20 | ○ | $17.0 \times 10^5$ | 2900 | ○ | ○ | ○ | ○ | ○ |

TABLE 7

| | | Alloy | | | | Brazability | | Tensile Strength after Brazing |
|---|---|---|---|---|---|---|---|---|
| | No. | 1st Brazing Filler Metal | Core Material | 2nd Brazing Filler Material/ Sacrificial Anode Material | Step | Manu- factur- ability | 1st Brazing Filler Metal | 2nd Brazing Filler Metal | Heating Measure- men (MP) |
| Comparative Example | 21 | A12 | B1 | — | E1 | ○ | x | — | 140 |
| | 22 | A13 | B1 | — | E1 | ○ | x | — | 143 |
| | 23 | A14 | B1 | — | E1 | ○ | x | — | 142 |
| | 24 | A15 | B1 | — | E1 | ○ | ○ | — | 148 |
| | 25 | A16 | B1 | — | E1 | ○ | ○ | — | 146 |
| | 26 | A17 | B1 | — | E1 | x | — | — | — |
| | 27 | A18 | B1 | — | E1 | x | — | — | — |
| | 28 | A19 | B1 | — | E1 | ○ | x | — | 141 |
| | 29 | A20 | B1 | — | E1 | ○ | x | — | 139 |
| | 30 | A21 | B1 | — | E1 | ○ | ○ | — | 140 |
| | 31 | A22 | B1 | — | E1 | ○ | ○ | — | 140 |
| | 32 | A1 | B9 | — | E1 | ○ | x | — | 167 |
| | 33 | A1 | B10 | — | E1 | ○ | x | — | 186 |
| | 34 | A1 | B11 | — | E1 | x | — | — | — |
| | 35 | A1 | B12 | — | E1 | x | — | — | — |
| | 36 | A1 | B13 | — | E1 | x | — | — | — |
| | 37 | A1 | B14 | — | E1 | x | — | — | — |
| | 38 | A1 | B15 | — | E1 | ○ | ○ | — | 115 |

| | No. | Tensile Strength after Brazing Heating Evalu- ation | Existence Density of Al-Mn Intermetallic Compounds having Circle-Equivalent Dia. ≥0.1 μm Before Brazing (pcs/mm²) | Existence Density of Al-Mn Intermetallic Compounds having Circle-Equivalent Dia. ≥2 μm After Brazing (pcs/mm²) | Corrosion Resistance 1st Brazing Filler Metal | | | | Sacrificial Anode Material |
|---|---|---|---|---|---|---|---|---|---|
| | | | | | Solution A | Solution B | Solution C | Solution D | |
| Comparative Example | 21 | ○ | $12.0 \times 10^5$ | 2800 | ○ | ○ | ○ | ○ | — |
| | 22 | ○ | $17.0 \times 10^5$ | 3200 | ○ | ○ | ○ | ○ | — |
| | 23 | ○ | $11.0 \times 10^5$ | 2100 | ○ | ○ | ○ | ○ | — |
| | 24 | ○ | $15.0 \times 10^5$ | 2900 | x | x | x | ○ | — |
| | 25 | ○ | $0.8 \times 10^5$ | 280 | x | x | ○ | ○ | — |
| | 26 | — | — | — | — | — | — | — | — |
| | 27 | — | — | — | — | — | — | — | — |
| | 28 | ○ | $15.0 \times 10^5$ | 3200 | ○ | ○ | ○ | ○ | — |
| | 29 | ○ | $17.0 \times 10^5$ | 3100 | ○ | ○ | ○ | ○ | — |
| | 30 | ○ | $11.0 \times 10^5$ | 2500 | x | x | x | ○ | — |
| | 31 | ○ | $16.0 \times 10^5$ | 2900 | x | x | x | ○ | — |
| | 32 | ○ | $16.0 \times 10^5$ | 3500 | ○ | ○ | ○ | ○ | — |
| | 33 | ○ | $14.0 \times 10^5$ | 2900 | ○ | ○ | ○ | ○ | — |
| | 34 | — | — | — | — | — | — | — | — |
| | 35 | — | — | — | — | — | — | — | — |
| | 36 | — | — | — | — | — | — | — | — |
| | 37 | — | — | — | — | — | — | — | — |
| | 38 | x | $11.0 \times 10^5$ | 2200 | ○ | ○ | ○ | ○ | — |

TABLE 8

| | No. | 1st Brazing Filler Metal | Core Material | 2nd Brazing Filler Material/ Sacrificial Anode Material | Step | Manu-factur-ability | Brazability 1st Brazing Filler Metal | Brazability 2nd Brazing Filler Metal | Tensile Strength after Brazing Heating Measure-ment (MPa) |
|---|---|---|---|---|---|---|---|---|---|
| Comparative Example | 39 | A1 | B1 | C10 | E1 | ○ | ○ | x | 142 |
| | 40 | A1 | B1 | C11 | E1 | ○ | ○ | x | 144 |
| | 41 | A1 | B1 | C12 | E1 | ○ | ○ | x | 139 |
| | 42 | A1 | B1 | C13 | E1 | x | — | — | — |
| | 43 | A1 | B1 | C14 | E1 | x | — | — | — |
| | 44 | A1 | B1 | C15 | E1 | x | — | — | — |
| | 45 | A1 | B1 | C16 | E1 | ○ | ○ | x | 140 |
| | 46 | A1 | B1 | C17 | E1 | ○ | ○ | x | 140 |
| | 47 | A1 | B1 | D12 | E1 | ○ | ○ | — | 144 |
| | 48 | A1 | B1 | D13 | E1 | x | — | — | — |
| | 49 | A1 | B1 | D14 | E1 | x | — | — | — |
| | 50 | A1 | B1 | D15 | E1 | ○ | ○ | — | 141 |
| | 51 | A1 | B1 | D16 | E1 | ○ | ○ | — | 142 |
| | 52 | A1 | B1 | D17 | E1 | x | — | — | — |
| | 53 | A1 | B1 | D18 | E1 | x | — | — | — |
| | 54 | A1 | B1 | D19 | E1 | x | — | — | — |

| | No. | Tensile Strength after Brazing Heating Evaluation | Existence Density of Al-Mn Intermetallic Compounds having Circle-Equivalent Dia. ≥0.1 μm Before Brazing (pcs/mm$^2$) | Existence Density of Al-Mn Intermetallic Compounds having Circle-Equivalent Dia. ≥2 μm After Brazing (pcs/mm$^2$) | Corrosion Resistance 1st Brazing Filler Metal Solution A | Solution B | Solution C | Solution D | Sacrificial Anode Material |
|---|---|---|---|---|---|---|---|---|---|
| Comparative Example | 39 | ○ | 12.0 × 10$^5$ | 2400 | ○ | ○ | ○ | ○ | — |
| | 40 | ○ | 13.0 × 10$^5$ | 2800 | ○ | ○ | ○ | ○ | — |
| | 41 | ○ | 13.0 × 10$^5$ | 2600 | ○ | ○ | ○ | ○ | — |
| | 42 | — | — | — | — | — | — | — | — |
| | 43 | — | — | — | — | — | — | — | — |
| | 44 | — | — | — | — | — | — | — | — |
| | 45 | ○ | 17.0 × 10$^5$ | 3400 | ○ | ○ | ○ | ○ | — |
| | 46 | ○ | 16.0 × 10$^5$ | 3300 | ○ | ○ | ○ | ○ | — |
| | 47 | ○ | 16.0 × 10$^5$ | 3100 | ○ | ○ | ○ | ○ | x |
| | 48 | — | — | — | — | — | — | — | — |
| | 49 | — | — | — | — | — | — | — | — |
| | 50 | ○ | 14.0 × 10$^5$ | 3000 | ○ | ○ | ○ | ○ | x |
| | 51 | ○ | 12.0 × 10$^5$ | 2600 | ○ | ○ | ○ | ○ | x |
| | 52 | — | — | — | — | — | — | — | — |
| | 53 | — | — | — | — | — | — | — | — |
| | 54 | — | — | — | — | — | — | — | — |

TABLE 9

| | No. | 1st Brazing Filler Metal | Core Material | 1st Brazing Filler Metal | Step | Manu-factur-ability | Brazability 1st Brazing Filler Metal | Brazability 1st Brazing Filler Metal | Tensile Strength after Brazing Heating Measure-ment (MPa) |
|---|---|---|---|---|---|---|---|---|---|
| Example of the Present Disclosure | 55 | A1 | B1 | — | E2 | ○ | ○ | — | 140 |
| | 56 | A1 | B1 | — | E3 | ○ | ○ | — | 138 |
| | 57 | A1 | B1 | — | E4 | ○ | ○ | — | 145 |
| | 58 | A1 | B1 | — | E5 | ○ | ○ | — | 144 |
| | 59 | A1 | B1 | — | E6 | ○ | ○ | — | 141 |

TABLE 9-continued

| | No. | | | | | | | | |
|---|---|---|---|---|---|---|---|---|---|
| Comparative Example | 60 | A1 | B1 | A1 | E7 | ○ | ○ | ○ | 144 |
| | 61 | A1 | B1 | A1 | E8 | ○ | ○ | ○ | 138 |
| | 62 | A1 | B1 | A1 | E9 | ○ | ○ | ○ | 146 |
| | 63 | A1 | B1 | — | E10 | ○ | ○ | — | 140 |
| | 64 | A1 | B1 | — | E11 | ○ | ○ | — | 141 |
| | 65 | A1 | B1 | — | E12 | x | — | — | — |

| | | Tensile Strength after Brazing Heating | Existence Density of Al—Mn Intermetallic Compounds having Circle-Equivalent Dia. ≥0.1 μm | Existence Density of Al—Mn Intermetallic Compounds having Circle-Equivalent Dia. ≥2 μm | Corrosion Resistance | | | | |
|---|---|---|---|---|---|---|---|---|---|
| | | | | | 1st Brazing Filler Metal | | | | Sacrificial |
| | No. | Evaluation | Before Brazing (pcs/mm²) | After Brazing (pcs/mm²) | Solution A | Solution B | Solution C | Solution D | Anode Material |
| Example of the Present Disclosure | 55 | ○ | 5.1 × 10⁵ | 1100 | ○ | ○ | ○ | ○ | — |
| | 56 | ○ | 1.2 × 10⁵ | 320 | ○ | ○ | ○ | ○ | — |
| | 57 | ○ | 1.0 × 10⁵ | 330 | ○ | ○ | ○ | ○ | — |
| | 58 | ○ | 1.8 × 10⁵ | 340 | ○ | ○ | ○ | ○ | — |
| | 59 | ○ | 3.2 × 10⁵ | 550 | ○ | ○ | ○ | ○ | — |
| Comparative Example | 60 | ○ | 0.9 × 10⁵ | 250 | x | x | ○ | ○ | — |
| | 61 | ○ | 0.7 × 10⁵ | 280 | x | x | ○ | ○ | — |
| | 62 | ○ | 0.6 × 10⁵ | 190 | x | x | ○ | ○ | — |
| | 63 | ○ | 0.7 × 10⁵ | 170 | x | x | ○ | ○ | — |
| | 64 | ○ | 0.6 × 10⁵ | 280 | x | x | ○ | ○ | — |
| | 65 | — | — | — | — | — | — | — | — |

In Tables 6 to 9, manufacturability is marked with "○" if the sample was successfully rolled to a final thickness of 0.4 mm without causing any problem in the production steps described above, while manufacturability is marked with "x" if the sample was not rolled to a final thickness of 0.4 mm because a crack developed during the casting or rolling, or if the sample was not formed into a clad material because melting occurred during the heating stage before the hot clad rolling step or during the intermediate annealing step, or because a pressure bonding failure occurred during the heat clad rolling stage.

Tables 6 to 9 show results of the below-mentioned evaluations that were conducted on the above-described clad material samples. Note that the below-mentioned evaluations were not conducted on the samples whose manufacturability is "x" in Tables 7 to 9 because a clad material could not be produced.

(Evaluation of Brazability)

The fin material for a heat exchanger was obtained by preparing and corrugating a fin material having a thickness of 0.07 mm, refining type H14, and the alloy composition of 3003 alloy with 1.0% Zn added. The obtained fin material was disposed on a surface of the first or second brazing filler metal of the clad material sample, dipped in a 5% aqueous solution of fluoride flux, and subjected to brazing heating at 600° C. for 3 minutes, by which a mini-core sample was produced. The brazability was evaluated as acceptable (○) when the mini-core sample exhibited a fin joining ratio of 95% or higher and no melting occurred in the clad material sample nor in the fin material. The brazability was evaluated as unacceptable (x) when (1) the fin joining ratio was less than 95%; and/or (2) melting occurred in at least either one of the clad material sample and the fin.

(Measurement of Tensile Strength after Brazing Heating)

After heat-treated at 600° C. for 3 minutes (equivalent to brazing heating), the clad material sample was subjected to a tensile test according to JIS Z2241 under the conditions: a tension rate of 10 mm/minute and a gauge length of 50 mm. Tensile strength levels were read from the obtained stress-strain curve. A sample was evaluated as acceptable (○) when the tensile strength was 120 MPa or higher, whereas a sample was evaluated as unacceptable (x) when the tensile strength was lower than 120 MPa.

(Measurement of Density Distribution of Intermetallic Compounds)

To examine Al—Mn based intermetallic compounds that had not been subjected to brazing-equivalent heating, a thin film sample was cut out from an L-ST section of the first brazing filler metal in each clad material sample by using FIB, and Mn element distribution mapping of the thin film sample was carried out by using energy-dispersive X-ray spectroscopy (EDS) on a scanning transmission electron microscope (STEM). For this purpose, the film thickness of each observed section was measured by using electron energy loss spectroscopy (EELS), and any area falling within 0.10 to 0.15 μm in thickness was observed under STEM. Five fields of view, 10 μm×10 μm each, were observed per sample, and images of Mn mapping of the individual fields of view were analyzed to obtain the distribution of Al—Mn based intermetallic compounds having a circle-equivalent diameter of 0.1 μm or larger.

To examine Al—Mn based intermetallic compounds after brazing-equivalent heating, that is, those which had been subjected to heat treatment equivalent to brazing, an L-LT section of the first brazing filler metal was polished to be flatten, and Mn element mapping was carried out by using EPMA. Five fields of view, 500 μm×500 μm each, were observed per sample, and images of Mn mapping of the individual fields of view were analyzed to obtain the distribution of Al—Mn based intermetallic compounds having a circle-equivalent diameter of 2 μm or larger. The conditions for brazing-equivalent heating according to the present disclosure are heating up to 600° C. and holding at 580° C. or higher for five minutes.

(Evaluation of Corrosion Resistance Based on Corrosion Depth Measurement)

After subjected to the brazing-equivalent heating, each clad material sample was cut into a 50 mm×50 mm piece, and its surface opposite to the test surface was masked with a resin. The surface of the first brazing filler metal in every sample was used as a test surface. Concerning the samples clad with the sacrificial anode material, the surface of the sacrificial anode material was also used as a test surface. No test was conducted on the surface of the second brazing filler metal as a test surface. In the case where the surface of the first brazing filler metal was used as a test surface, NaCl solutions (in pure water) with chloride ions at concentrations of 3 ppm (Solution A), 5 ppm (Solution B), 1,000 ppm (Solution C), and 1,200 ppm (Solution D), respectively, were used as test solutions. The individual test samples were subjected to a three-month cyclic immersion, where each cycle includes immersing the test samples in these test solutions in hot water at 88° C. for 8 hours followed by leaving the samples at room temperature for 16 hours. Samples having no corrosion perforation were evaluated as acceptable (○), while samples having corrosion perforation were evaluated as unacceptable (x). In the case where the surface of the sacrificial anode material is used as a test surface, samples were subjected to the SWAAT test according to ASTM-G85. Samples having generated no corrosion perforation in 1,000 hours were evaluated as acceptable (○), while sample having generated corrosion perforation were evaluated as unacceptable (x).

Examples 1 to 20 and 55 to 59 of the present disclosure, which satisfied the requirements specified in the present disclosure, were acceptable in all items: manufacturability, brazability, tensile strength after brazing, and corrosion resistance.

In contrast, Comparative Example 21 was unacceptable in brazability because the Si content of the first brazing filler metal was too low.

Comparative Example 22 was unacceptable in brazability because the Si content of the first brazing filler metal was too high.

Comparative Example 23 was unacceptable in brazability because the Fe content of the first brazing filler metal was too high.

Comparative Example 24 was unacceptable in corrosion resistance in Solutions A, B, and C because the Cu content of the first brazing filler metal was too high.

Comparative Example 25 was unacceptable in corrosion resistance in Solutions A and B because the Mn content of the first brazing filler metal was so low that the distribution of Al—Mn based intermetallic compounds obtained after brazing heating was not satisfactory.

Comparative Example 26 was unacceptable in manufacturability because the Mn content of the first brazing filler metal was so high that a crack developed during rolling and the clad material could not be produced.

Comparative Example 27 was unacceptable in manufacturability because the Ti content, the Zr content, the Cr content, and the V content of the first brazing filler metal were so high that a crack developed during rolling and the clad material could not be produced.

Comparative Example 28 was unacceptable in brazability because the Na content of the first brazing filler metal was too high.

Comparative Example 29 was unacceptable in brazability because the Sr content of the first brazing filler metal was too high.

Comparative Example 30 was unacceptable in corrosion resistance in Solutions A, B, and C because the Zn content of the first brazing filler metal was too low.

Comparative Example 31 was unacceptable in corrosion resistance in Solutions A, B, and C because the Zn content of the first brazing filler metal was too high.

Comparative Example 32 was unacceptable in brazability because the Si content of the core material was too high.

Comparative Example 33 was unacceptable in brazability because the Mg content of the core material was too high.

Comparative Example 34 was unacceptable in manufacturability because the Fe content of the core material was so high that a crack developed during rolling and the clad material could not be produced.

Comparative Example 35 was unacceptable in manufacturability because the Ti content, the Zr content, the Cr content, and the V content of the core material were so high that a crack developed during rolling and the clad material could not be produced.

Comparative Example 36 was unacceptable in manufacturability because the Mn content of the core material was so high that a crack developed during rolling and the brazing sheet could not be produced.

Comparative Example 37 was unacceptable in manufacturability because the Cu content of the core material was so high that a crack developed during casting and the brazing sheet could not be produced.

Comparative Example 38 was unacceptable in tensile strength after brazing because the Mn content of the core material was too low.

Comparative Example 39 was unacceptable in brazability of the second brazing filler metal because the Si content of the second brazing filler metal was too low.

Comparative Example 40 was unacceptable in brazability of the second brazing filler metal because the Si content of the second brazing filler metal was too high.

Comparative Example 41 was unacceptable in brazability of the second brazing filler metal because the Fe content of the second brazing filler metal was too high.

Comparative Example 42 was unacceptable in manufacturability because the Cu content of the second brazing filler metal was so high that a crack developed during casting and the clad material could not be produced.

Comparative Example 43 was unacceptable in manufacturability because the Mn content of the second brazing filler metal was so high that a crack developed during rolling and the clad material could not be produced.

Comparative Example 44 was unacceptable in manufacturability because the Ti content, the Zr content, the Cr content, and the V content of the second brazing filler metal were so high that a crack developed during rolling and the brazing sheet could not be produced.

Comparative Example 45 was unacceptable in brazability of the second brazing filler metal because the Na content of the second brazing filler metal was too high.

Comparative Example 46 was unacceptable in brazability of the second brazing filler metal because the Sr content of the second brazing filler metal was too high.

Comparative Example 47 was unacceptable in corrosion resistance of the sacrificial anode material because the Si content of the sacrificial anode material was too high.

Comparative Example 48 was unacceptable in manufacturability because the Fe content of the sacrificial anode material was so high that a crack developed during rolling and the clad material could not be produced.

Comparative Example 49 was unacceptable in manufacturability because the Ti content, the Zr content, the Cr content, and the V content of the sacrificial anode material were so high that a crack developed during rolling and the clad material could not be produced.

Comparative Example 50 was unacceptable in corrosion resistance of the sacrificial anode material because the Zn content of the sacrificial anode material was too low.

Comparative Example 51 was unacceptable in corrosion resistance of the sacrificial anode material because the Zn content of the sacrificial anode material was too high.

Comparative Example 52 was unacceptable in manufacturability because the Ni content of the sacrificial anode material was so high that a crack developed during rolling and the clad material could not be produced.

Comparative Example 53 was unacceptable in manufacturability because the Mn content of the sacrificial anode material was so high that a crack developed during rolling and the clad material could not be produced.

Comparative Example 54 was unacceptable in manufacturability because the Mg content of the sacrificial anode material was so high that pressure bonding between the core material and the sacrificial anode material failed and the clad material could not be produced.

Comparative Example 60 was unacceptable in corrosion resistance in Solutions A and B because the rate of temperature rise was too low up to 400° C. in the hot rolling stage during the step of hot rolling the first brazing filer metal, and thus the distribution of Al—Mn based compounds obtained after brazing heating was not satisfactory.

Comparative Example 61 was unacceptable in corrosion resistance in Solutions A and B because the rate of temperature rise was too high from 400° C. attained in the heating stage during the step of hot rolling the first brazing filler metal to the holding temperature in the holding stage, and thus the distribution of Al—Mn based intermetallic compounds obtained after brazing heating was not satisfactory.

Comparative Example 62 was unacceptable in corrosion resistance in Solutions A and B because the holding temperature in the holding stage during the step of hot rolling the first brazing filler metal was so low that the distribution of Al—Mn based intermetallic compounds obtained after brazing heating was not satisfactory.

Comparative Example 63 was unacceptable in corrosion resistance in Solutions A and B because the holding time in the holding stage during the step of hot rolling the first brazing filler metal was so short that the distribution of Al—Mn based intermetallic compounds obtained after brazing heating was not satisfactory.

Comparative Example 64 was unacceptable in corrosion resistance in Solutions A and B because the time period during which the clad material is at 400° C. or higher during the step of hot rolling the first brazing filler metal was so short that the distribution of Al—Mn based intermetallic compounds obtained after brazing heating was not satisfactory.

Comparative Example 65 was unacceptable in manufacturability because the heating temperature in the holding stage during the step of hot rolling the first brazing filler metal was so high that the first brazing filler metal melted, and thus the brazing sheet could not be produced.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application is based on Japanese Patent Application No. 2015-137331 filed on Jul. 8, 2015, and on Japanese Patent Application No. 2016-132727 filed on Jul. 4, 2016. The descriptions, claims, and drawings of Japanese Patent Application No. 2015-137331 and Japanese Patent Application No. 2016-132727 are incorporated herein by reference in their entirety.

INDUSTRIAL APPLICABILITY

The aluminum alloy clad material according to the present disclosure is suitably used as, among others, a passage forming component for an automotive heat exchanger because the clad material is excellent not only in corrosion resistance but also in brazability such as fin joining ratios and erosion resistance.

REFERENCE SIGNS LIST

1 Plate
2 Corrugated fin

The invention claimed is:

1. An aluminum alloy clad material comprising:
a core material comprising an aluminum alloy; and
a first brazing filler metal that is clad on one surface or both surfaces of the core material,
wherein the core material comprises an aluminum alloy containing Si: 0.05 to 1.50 mass %, Fe: 0.05 to 2.00 mass %, and Mn: 0.5 to 2.0 mass %, with a balance being Al and inevitable impurities,
wherein the first brazing filler metal comprises an aluminum alloy containing Si: 2.5 to 7.0 mass %, Fe: 0.05 to 1.20 mass %, Zn: 0.5 to 8.0 mass %, and Mn: 0.3 to 2.0 mass %, with the balance being Al and inevitable impurities,
wherein an existence density of Al—Mn based intermetallic compounds having a circle-equivalent diameter of at least 0.1 μm in the first brazing filler metal before brazing heating is at least $1.0 \times 10^5$ pieces/mm$^2$, and
wherein an existence density of Al—Mn based intermetallic compounds having a circle-equivalent diameter of at least 2 μm in the first brazing filler metal after brazing heating is at least 300 pieces/mm$^2$, wherein brazing heating is performed by heating the first brazing filler metal between 590 and 610 degrees Celsius for 2 to 10 minutes.

2. The aluminum alloy clad material according to claim 1, wherein the first brazing filler metal comprises the aluminum alloy further containing at least one selected from Cu: 0.05 to 0.60 mass %, Ti: 0.05 to 0.30 mass %, Zr: 0.05 to 0.30 mass %, Cr: 0.05 to 0.30 mass %, and V: 0.05 to 0.30 mass %.

3. The aluminum alloy clad material according to claim 1, wherein the first brazing filler metal comprises the aluminum alloy further containing at least one selected from Na: 0.001 to 0.050 mass % and Sr: 0.001 to 0.050 mass %.

4. The aluminum alloy clad material according to claim 1, wherein the core material comprises the aluminum alloy further containing at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

5. A method for producing the aluminum alloy clad material according to claim 1, the method comprising:
- a step of casting the aluminum alloys for the core material and the first brazing filler metal, respectively;
- a hot rolling step of hot rolling an ingot of the cast first brazing filler metal to a predetermined thickness;
- a cladding step of obtaining a clad material by cladding the first brazing filler metal that has been hot rolled to a predetermined thickness on one surface or both surfaces of an ingot of the core material;
- a hot clad rolling step of hot rolling the clad material;
- a cold rolling step of cold rolling the clad material that has been hot clad rolled; and
- at least one annealing step of annealing the clad material carried out during or after the cold rolling step or during and after the cold rolling step,
- wherein the step of hot rolling the first brazing filler metal comprises a heating stage, a holding stage, and a hot rolling stage,
- wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower,
- wherein, in the holding stage, the holding temperature is between 450 and 560° C. inclusive and a holding time is at least one hour, and
- wherein a time period during which the first brazing filler metal is at a temperature of at least 400° C. in the hot rolling stage is at least 5 minutes.

6. An aluminum alloy clad material comprising:
a core material comprising an aluminum alloy;
a first brazing metal that is clad on one surface of the core material; and
a second brazing filler metal that is clad on another surface of the core material,
wherein the core material comprises an aluminum alloy containing Si: 0.05 to 1.50 mass %, Fe: 0.05 to 2.00 mass %, and Mn: 0.5 to 2.0 mass %, with a balance being Al and inevitable impurities,
wherein the first brazing filler metal comprises an aluminum alloy containing Si: 2.5 to 7.0 mass %, Fe: 0.05 to 1.20 mass %, Zn: 0.5 to 8.0 mass %, and Mn: 0.3 to 2.0 mass %, with the balance being Al and inevitable impurities,
wherein the second brazing filler metal comprises an aluminum alloy containing Si: 2.5 to 13.0 mass % and Fe: 0.05 to 1.20 mass %, with the balance being Al and inevitable impurities,
wherein an existence density of Al—Mn based intermetallic compounds having a circle-equivalent diameter of at least 0.1 μm in the first brazing filler metal before brazing heating is at least $1.0 \times 10^5$ pieces/mm$^2$, and
wherein an existence density of Al—Mn based intermetallic compounds having a circle-equivalent diameter of at least 2 μm in the first brazing filler after brazing heating is at least 300 pieces/mm$^2$, wherein brazing heating is performed by heating the first brazing filler metal between 590 and 610 degrees Celsius for 2 to 10 minutes.

7. The aluminum alloy clad material according to claim 6, wherein the first brazing filler metal comprises the aluminum alloy further containing at least one selected from Cu: 0.05 to 0.60 mass %, Ti: 0.05 to 0.30 mass %, Zr: 0.05 to 0.30 mass %, Cr: 0.05 to 0.30 mass %, and V: 0.05 to 0.30 mass %.

8. The aluminum alloy clad material according to claim 6, wherein the first brazing filler metal comprises the aluminum alloy further containing at least one selected from Na: 0.001 to 0.050 mass % and Sr: 0.001 to 0.050 mass %.

9. The aluminum alloy clad material according to claim 6, wherein the core material comprises the aluminum alloy further containing at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

10. The aluminum alloy clad material according to claim 6, wherein the second brazing filler metal comprises the aluminum alloy further containing at least one selected from Mn: 0.05 to 2.00 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

11. The aluminum alloy clad material according to claim 6, wherein the second brazing filler metal comprises the aluminum alloy further containing at least one selected from Na: 0.001 to 0.050 mass % and Sr: 0.001 to 0.050 mass %.

12. A method for producing the aluminum alloy clad material according to claim 6, the method comprising:
- a step of casting the aluminum alloys for the core material, the first brazing filler metal, and the second brazing filler metal, respectively;
- a hot rolling step of hot rolling each of ingots of the cast first brazing filler metal and the cast second brazing filler metal to a predetermined thickness;
- a cladding step of obtaining a clad material by cladding the first brazing filler metal that has been hot rolled to a predetermined thickness on one surface of the ingot of the core material, and by cladding the second brazing filler metal that has been hot rolled to a predetermined thickness on the other surface of the ingot of the core material;
- a hot clad rolling step of hot rolling the clad material;
- a cold rolling step of cold rolling the clad material that has been hot clad rolled; and
- at least one annealing step of annealing the clad material carried out during or after the cold rolling step or during and after the cold rolling step,
- wherein the step of hot rolling the first brazing filler metal comprises a heating stage, a holding stage, and a hot rolling stage,
- wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower,
- wherein, in the holding stage, the holding temperature is between 450 and 560° C. inclusive and a holding time is at least one hour, and
- wherein a time period during which the first brazing filler metal is at a temperature of at least 400° C. in the hot rolling stage is at least 5 minutes.

13. An aluminum alloy clad material comprising:
a core material comprising an aluminum alloy;
a first brazing metal that is clad on one surface of the core material; and
a sacrificial anode material metal that is clad on another surface of the core material,
wherein the core material comprises an aluminum alloy containing Si: 0.05 to 1.50 mass %, Fe: 0.05 to 2.00 mass %, and Mn: 0.5 to 2.0 mass %, with a balance being Al and inevitable impurities, wherein the first brazing filler metal comprises an aluminum alloy containing Si: 2.5 to 7.0 mass %, Fe: 0.05 to 1.20 mass %, Zn: 0.5 to 8.0 mass %, and Mn: 0.3 to 2.0 mass %, with the balance being Al and inevitable impurities, wherein the sacrificial anode material comprises an aluminum alloy containing Zn: 0.5 to 8.0 mass %, Si: 0.05 to 1.50 mass % and Fe: 0.05 to 2.00 mass %, with the balance being Al and inevitable impurities, wherein an existence density of Al—Mn based intermetallic compounds having a circle-equivalent diameter of at least 0.1 μm in the first brazing filler metal before brazing heating is at least $1.0 \times 10^5$ pieces/mm$^2$, and wherein an existence density of Al—Mn based intermetallic compounds having a circle-equivalent diameter of at least 2 μm in the first brazing filler metal after brazing heating is at least 300 pieces/mm$^2$, wherein brazing heating is performed by heating the first brazing filler metal between 590 and 610 degrees Celsius for 2 to 10 minutes.

14. The aluminum alloy clad material according to claim 13, wherein the first brazing filler metal comprises the aluminum alloy further containing at least one selected from Cu: 0.05 to 0.60 mass %, Ti: 0.05 to 0.30 mass %, Zr: 0.05 to 0.30 mass %, Cr: 0.05 to 0.30 mass %, and V: 0.05 to 0.30 mass %.

15. The aluminum alloy clad material according to claim 13, wherein the first brazing filler metal comprises the aluminum alloy further containing at least one selected from Na: 0.001 to 0.050 mass % and Sr: 0.001 to 0.050 mass %.

16. The aluminum alloy clad material according to claim 13, wherein the core material comprises the aluminum alloy further containing at least one selected from Mg: 0.05 to 0.50 mass %, Cu: 0.05 to 1.50 mass %, Ti: 0.05 to 0.30 mass %, Zr: 0.05 to 0.30 mass %, Cr: 0.05 to 0.30 mass %, and V: 0.05 to 0.30 mass %.

17. The aluminum alloy clad material according to claim 13, wherein the sacrificial anode material comprises the aluminum alloy further containing at least one selected from Ni: 0.05 to 2.00 mass %, Mn: 0.05 to 2.00 mass %, Mg: 0.05 to 3.00 mass %, Ti: 0.05 to 0.30 mass %, Zr: 0.05 to 0.30 mass %, Cr: 0.05 to 0.30 mass %, and V: 0.05 to 0.30 mass %.

18. A method for producing the aluminum alloy clad material according to claim 13, the method comprising:
a step of casting the aluminum alloys for the core material, the first brazing filler metal, and the sacrificial anode material, respectively;
a hot rolling step of hot rolling each of ingots of the cast first brazing filler metal and the cast sacrificial anode material to a predetermined thickness;
a cladding step of obtaining a clad material by cladding the first brazing filler metal that has been hot rolled to a predetermined thickness on one surface of the ingot of the core material, and by cladding the sacrificial anode material that has been hot rolled to a predetermined thickness on the other surface of the ingot of the core material;
a hot clad rolling step of hot rolling the clad material;
a cold rolling step of cold rolling the clad material that has been hot clad rolled; and
at least one annealing step of annealing the clad material carried out during or after the cold rolling step or during and after the cold rolling step,
wherein the step of hot rolling the first brazing filler metal comprises a heating stage, a holding stage, and a hot rolling stage,
wherein a rate of temperature rise until a temperature reaches 400° C. in the heating stage is 30° C./h or higher, and a rate of temperature rise from when the temperature reaches 400° C. until the temperature reaches a holding temperature in the holding stage is 60° C./h or lower,
wherein, in the holding stage, the holding temperature is between 450 and 560° C. inclusive and a holding time is at least one hour, and
wherein a time period during which the first brazing filler metal is at a temperature of at least 400° C. in the hot rolling stage is at least 5 minutes.

19. A heat exchanger comprising the aluminum alloy clad material according to claim 1, the aluminum alloy clad material being used as at least a passage forming component, wherein at least either one of surfaces of the first brazing filler metal is exposed to a solution with chloride ions at a concentration of 1,200 ppm or less.

20. A heat exchanger comprising the aluminum alloy clad material according to claim 6, the aluminum alloy clad material being used as at least a passage forming component, wherein a surface of the first brazing filler metal is exposed to a solution with chloride ions at a concentration of 1,200 ppm or less.

21. A heat exchanger comprising the aluminum alloy clad material according to claim 13, the aluminum alloy clad material being used as at least a passage forming component, wherein a surface of the first brazing filler metal is exposed to a solution with chloride ions at a concentration of 1,200 ppm or less.

* * * * *